(12) United States Patent
Cafaro et al.

(10) Patent No.: US 12,336,592 B2
(45) Date of Patent: Jun. 24, 2025

(54) FOOTWEAR ASSEMBLY WITH 3-D PRINTED SOLE ASSEMBLY

(71) Applicant: HILOS, Inc., Portland, OR (US)

(72) Inventors: Giovanna Cafaro, Portland, OR (US); Mikele Schnitman, Portland, OR (US); Gaia Giladi, Portland, OR (US); Elias Stahl, Portland, OR (US)

(73) Assignee: HILOS, Inc., Portland, OR (US)

( * ) Notice: Subject to any disclaimer, the term of this patent is extended or adjusted under 35 U.S.C. 154(b) by 0 days.

(21) Appl. No.: 18/322,529

(22) Filed: May 23, 2023

(65) Prior Publication Data

US 2023/0380541 A1    Nov. 30, 2023

Related U.S. Application Data

(60) Provisional application No. 63/345,833, filed on May 25, 2022.

(51) Int. Cl.
*A43B 13/18* (2006.01)
*A43B 13/28* (2006.01)

(52) U.S. Cl.
CPC ............ *A43B 13/181* (2013.01); *A43B 13/28* (2013.01)

(58) Field of Classification Search
CPC .......... A43B 13/181; A43B 3/10; A43B 3/108
USPC .............................................................. 36/28
See application file for complete search history.

(56) References Cited

U.S. PATENT DOCUMENTS

| | | | |
|---|---|---|---|
| 6,857,202 B2* | 2/2005 | Pfander | A43B 13/181 36/3 R |
| 10,143,266 B2* | 12/2018 | Spanks | A43B 13/181 |
| 10,631,592 B2* | 4/2020 | Lee-Sang | A43B 13/04 |
| 2001/0010128 A1* | 8/2001 | Bray, Jr. | A43B 9/08 36/21 |
| 2005/0155255 A1 | 7/2005 | Wilson et al. | |
| 2015/0351493 A1* | 12/2015 | Ashcroft | A43B 13/18 36/132 |

(Continued)

OTHER PUBLICATIONS

International Searching Authority, International Search Report and Written Opinion, PCT Patent Application PCT/US2023/023280, mailed Aug. 25, 2023, 12 pages.

*Primary Examiner* — Timothy K Trieu
(74) *Attorney, Agent, or Firm* — Perkins Coie LLP

(57) ABSTRACT

Footwear comprising a sole assembly affixed to a lower portion of an upper. The sole assembly is made at least partially by an additive manufacturing process. The sole assembly has a platform layer and a lattice with interconnected laths extending away from the platform layer in at least forefoot and heel portions. The lattice and platform layer support the wearer's foot, and the laths in the lattice provide cushioning to the foot. A plurality of spaced-apart internal support structures that extend away from the platform layer and define cavities within the sole assembly. The internal support structures also provide cushioning to the wearer's foot. The sole assembly has a perimeter portion bounded within the sole assembly, and integral anchor features are adjacent to the perimeter portion and adjacent to at least one of the cavities. The upper is fastened to the perimeter portion with fastening features that securely engaged and affixed to the anchor features without penetrating into the cavities. An outsole portion is connected to the bottom of the sole assembly and forms a ground engaging surface.

20 Claims, 35 Drawing Sheets

(56) References Cited

U.S. PATENT DOCUMENTS

| | | |
|---|---|---|
| 2020/0093221 A1 | 3/2020 | Caldwell et al. |
| 2020/0163408 A1 | 5/2020 | Guyan |
| 2021/0330030 A1 | 10/2021 | Folsom et al. |

* cited by examiner

FOOTWEAR ASSEMBLY WITH 3-D PRINTED SOLE ASSEMBLY

CROSS-REFERENCE TO RELATED APPLICATION

This non-provisional patent application claims the benefit of and priority to U.S. Provisional Patent Application No. 63/345,833, titled FOOTWEAR ASSEMBLY WITH 3-D PRINTED SOLE ASSEMBLY, filed May 25, 2022, which is incorporated herein in its entirety by reference thereto.

TECHNICAL FIELD

This patent application is generally directed to footwear, and more particularly to footwear with a 3-D printed or additive manufacturing construction.

BACKGROUND

Typically, footwear is assembled by bonding or affixing several separate layers together (e.g., insole, midsole, and outsole), with the upper attached to the sole by relying on the layering method, fitting in between a midsole and outsole or midsole and insole. An upper covers the top and sides of the user's foot, and the sole covers the bottom of the user's foot and makes contact with the ground. The upper and the sole components, and/or parts thereof, can be assembled together during manufacture or after manufacturing of each component. Conventional footwear has a large number of components that must be created, finished, and assembled into the final product. As a result, each of these many parts must be handled during assembly, which can make the assembly process labor intensive. In addition, the large number of components result in a large parts inventory that must be managed. Furthermore, the cement used for bonding these layers together prevents product disassembly for recycling. The process of creating, lasting, assembling, and finishing the footwear with so many components is labor intensive, which increases the complexity of constructing the conventional footwear while necessitating moving its production to areas with low labor costs. There is a need for a footwear assembly with significantly fewer components that can be made and assembled quickly, easily, and inexpensively while accommodating for higher labor costs within developed economies and still providing a highly fashionable, functional, durable, and comfortable product.

SUMMARY

The footwear assemblies and related methods disclosed herein overcome drawbacks of the prior art and provide additional benefits. An embodiment of the present technology provides a footwear assembly, comprising an upper defining an interior area configured to receive a foot of a wearer. A sole assembly is affixed to a lower portion of the upper. The sole assembly is made by an additive manufacturing process. The sole assembly has a heel portion and a forefoot portion. The sole assembly has an insole portion with a platform layer and a lattice with interconnected laths extending away from the platform layer in at least the forefoot and heel portions. The lattice and platform layer are positioned to support the foot of the wearer on the sole assembly, and the laths in the lattice are configured to flex or bend to provide first cushioning to the foot of the wearer. The sole assembly has a plurality of spaced-apart internal support structures that extend downwardly away from the platform layer and define cavities within the sole assembly. The internal support structures are located at least in the heel portion or the forefoot portion, and the support structures are configured to flex or bend to provide second cushioning to the foot of the wearer. The sole assembly has a perimeter portion bounded within the sole assembly, and the sole assembly has a plurality of integral anchor features positioned adjacent to the perimeter portion and adjacent to at least one of the cavities. The lower portion of the upper is fastened to the perimeter portion of the sole assembly with fastening features securely engaged and affixed to the anchor features without penetrating into the cavities. The sole assembly has an outsole portion connected to the bottom of the sole assembly and forming a ground engaging surface, wherein the outsole portion is positioned to close and seal the cavities in the sole assembly.

In some embodiments, the sole assembly comprises the insole portion integrally connected to a midsole portion that has one or more integral first attachment features. The outsole portion has one or more second attachment features that mateably engage the first attachment features and fixedly attach the outsole portion to the bottom of the midsole portion to enclose the cavities within the midsole portion. This allows for quick, easy, and precise assembly of the outsole portion to the midsole portion so as to close and seal the cavities within the midsole portion.

Another embodiment of the present technology provides a footwear assembly comprising an upper and a sole assembly affixed to a lower portion of the upper. The sole assembly is made by an additive manufacturing process. The sole assembly has a heel portion, a forefoot portion, and a perimeter portion around the heel and forefoot portions. The sole assembly has a midsole portion, an insole portion atop the midsole portion, and an outsole portion connected to the bottom of the midsole portion. The insole portion includes a lattice with a plurality of interconnected laths. The lattice is positioned at least in the forefoot and heel portions. The lattice is positioned to support the foot of the wearer, and the laths in the lattice are configured to flex and provide cushioning to the foot of the wearer. The sole assembly has a plurality of internal support structures that extend downwardly relative to the lattice and define cavities within the sole assembly. The internal support structures are located at least in the heel portion or the forefoot portion, and the support structures are configured to flex in response to loads applied from the wearer's foot during use. The sole assembly has a plurality of integral anchor features positioned radially outward of the cavities and the support structures. The lower portion of the upper is fastened to the perimeter portion of the sole assembly with fastening features that are embedded in the anchor features. The outsole portion is positioned to close at least a portion of the cavities in the sole assembly and to form a ground engaging surface.

Another embodiment of the present technology provides a footwear sole assembly comprising an insole portion and a midsole portion formed as a unitary structure by an additive manufacturing process. An outsole portion is attached to the midsole portion. The sole assembly has a heel portion, a forefoot portion, and a perimeter portion around the heel and forefoot portions, wherein the perimeter portion is configured for connection to a lower portion of the upper. The insole portion comprises a platform layer and lattice, the platform layer is above the midsole portion. The lattice has a plurality of interconnected laths extending away from the platform layer. The lattice is positioned at least in the forefoot and heel portions. The laths in the lattice are configured to flex and provide cushioning to the foot of the wearer. The midsole portion has a plurality of internal support structures that extend downwardly relative to the platform layer and define cavities within the midsole portion. The internal support structures are located at least in the heel portion or the forefoot portion. The support structures are configured to flex in response to loads applied from the wearer's foot during use. The upper insole portion or the midsole portion have a plurality of integral anchor features positioned radially outward of the cavities and the support structures. The perimeter portion of the sole assembly is configured to be attached to the lower portion of the upper with fastening features that are embedded in the anchor features. The outsole portion is positioned to close at least a portion of the cavities in the sole assembly and to form a ground engaging surface.

Another embodiment of the present technology provides a sole assembly for footwear that has an upper. The sole assembly is formed by additive manufacturing, and it has an insole portion, a midsole portion, and an outsole portion. The midsole portion and outsole portion are formed together as a unitary structure, and the upper insole portion is attached atop the midsole portion. The sole assembly has a heel portion, a forefoot portion, and a perimeter portion around the heel and forefoot portions. The insole portion is above the midsole portion and comprises a platform layer and lattice. The lattice has a plurality of interconnected laths extending away from the platform layer. The lattice is positioned at least in the forefoot and heel portions, and the laths in the lattice are configured to flex and provide cushioning to the foot of the wearer. The midsole portion has a plurality of internal support structures that extend downwardly relative to the platform layer and define cavities within the midsole portion. The internal support structures are located at least in the heel portion or the forefoot portion. The support structures are configured to flex in response to loads applied from the wearer's foot during use. The upper insole portion or the midsole portion have a plurality of integral anchor features positioned radially outward of the cavities and the support structures, wherein the sole assembly is configured to be attached to the lower portion of the upper with fastening features that are embedded in the anchor features. The insole portion is positioned to close at least a portion of the cavities in the sole assembly when attached to the midsole portion.

Another embodiment of the present technology provides a method of manufacturing a footwear assembly that has an upper and a sole assembly. The method comprises forming the sole assembly via additive manufacturing. The sole assembly comprises an outsole portion, a midsole portion, and an insole portion. The outsole portion is coupled to the bottom of a midsole portion, and the insole portion is positioned atop the midsole portion. The sole assembly has a heel portion, a forefoot portion, and a perimeter portion around the heel and forefoot portions. The insole portion has a lattice with a plurality of interconnected laths. The lattice is positioned at least in the forefoot and heel portions, and the lattice is positioned to support the foot of the wearer. The laths in the lattice are configured to flex and provide cushioning to the foot of the wearer. The midsole portion has a plurality of spaced-apart internal support structures that extend downwardly relative to the lattice and define cavities within the sole. The internal support structures are located at least in the heel portion or the forefoot portion. The support structures are configured to flex in response to loads applied from the wearer's foot during use. The midsole portion has one or more first attachment features, and the insole portion or the outsole portion have one or more second attachment features that mateably connect to the first attachment features. The other of the insole or outsole portions is integrally formed with the midsole portion. The sole assembly has a plurality of integral anchor features positioned radially outward of the cavities and the support structures. The method also includes connecting the other one of the insole or outsole portions to the sole portion by mateably interconnecting the first and second attachment features. The method also includes attaching the upper to the sole assembly.

Embodiments of the footwear assembly and manufacturing process introduced herein may be better understood by referring to the following Detailed Description in conjunction with the accompanying drawings, in which like reference numerals indicate identical or functionally similar elements.

BRIEF DESCRIPTION OF THE DRAWINGS

Embodiments of the footwear assembly and manufacturing process introduced herein may be better understood by referring to the following Detailed Description in conjunction with the accompanying drawings, in which like reference numerals indicate identical or functionally similar elements.

Figure 1A:
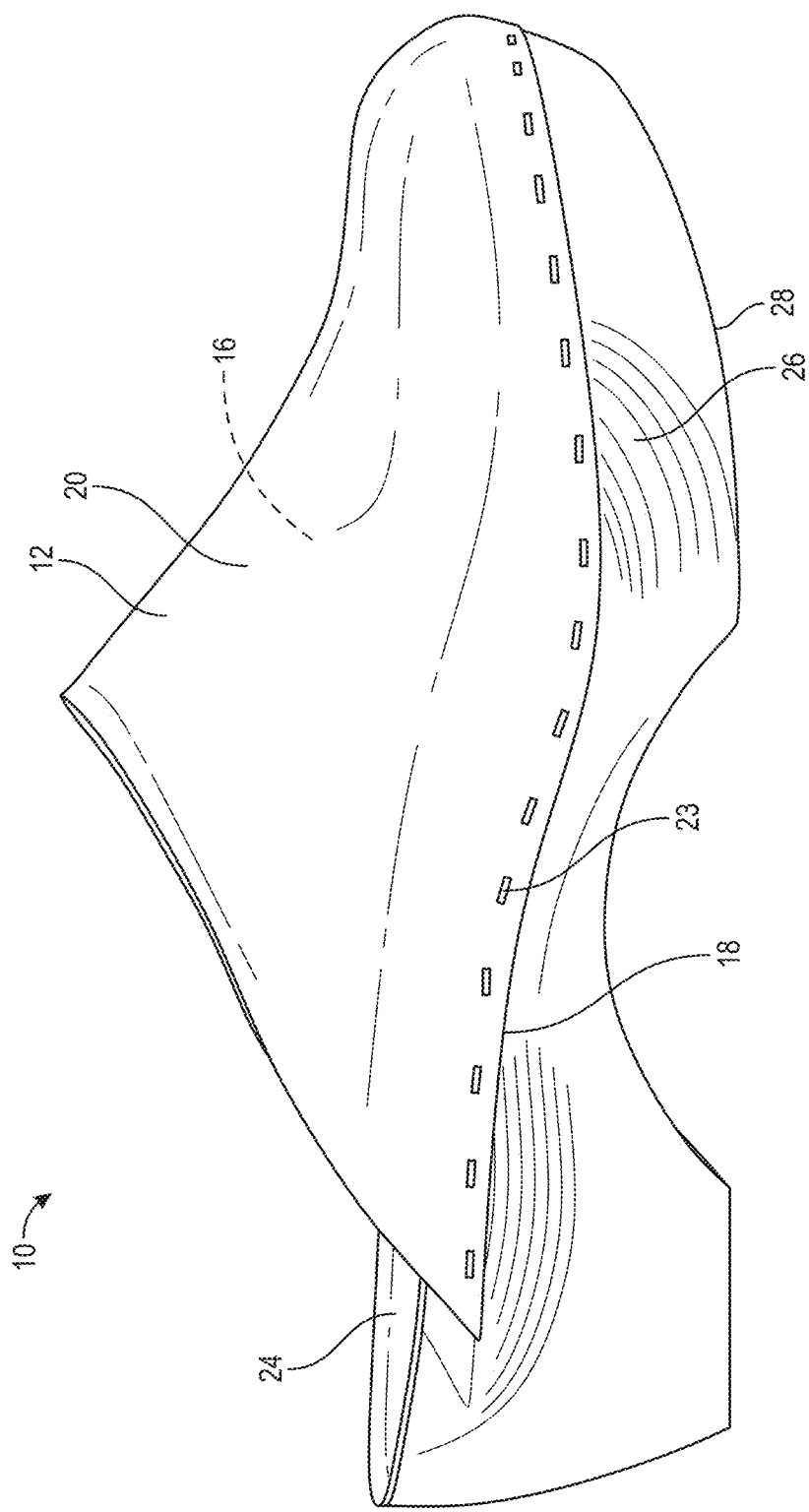
FIGS. 1A and 1B are side views of footwear assemblies in accordance with one or more embodiments of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Various examples of the footwear assembly introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. For purposes of simplicity of discussion, the footwear assembly will be described herein with reference to top and bottom, upper and lower, above and below, and/or left or right relative to the spatial orientation of the embodiment(s) shown in the figures. It is to be understood that the footwear assembly, however, can be moved to and used in different spatial orientations without changing the structure of the system.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1B:
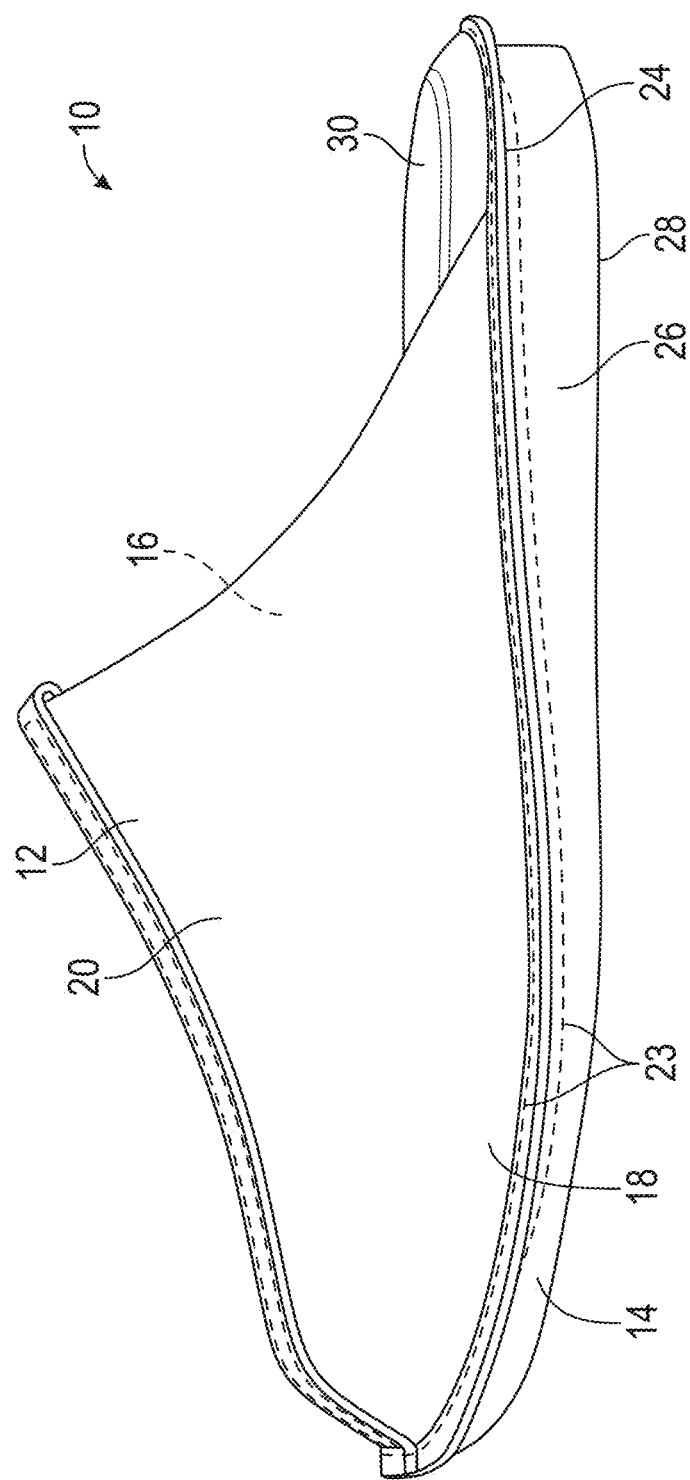

FIGS. 1A and 1B illustrate footwear assemblies 10 in accordance with one or more embodiments of the present technology. The footwear assembly 10 has an upper 12 attached to a sole assembly 14 so as to define an interior area 16 configured to receive a foot of a wearer. The upper 12 has a lower portion 18 integrally coupled to a vamp portion 20 that extends over the sole assembly 14 to form the top of the interior area 16. The footwear assemblies 10 shown in FIGS. 1A and 1B are clog and slide-style shoes, respectively. These are only two examples of the footwear style that can include the present technology. It is to be understood that the footwear assembly 10 of the present technology can include other footwear styles, such as styles that may have a heel strap, an enclosed heel cup, an open-toe configuration, or other configurations. Further, the footwear assembly 10 in accordance with the present technology can be a shoe, a boot, a sandal, or other style of footwear.

The sole assembly 14 is affixed or otherwise coupled to the lower portion 18 of the upper 12. In the embodiments in FIGS. 1A and 1B, the lower edge of the upper 12 is secured to a portion of the periphery 22 of the sole assembly. In other embodiments, the lower portion 18 of the upper 12 may wrap around part of the sole assembly, such that the actual edge area of the upper 12 may be captured on or within a portion of the sole assembly 10, which is discussed in greater detail below. The upper 12 can be attached to the sole assembly 14 with fasteners 23, such as staples, nails, rivets, stitching, or via an adhesive, or a combination of securing techniques.

Figure 2:
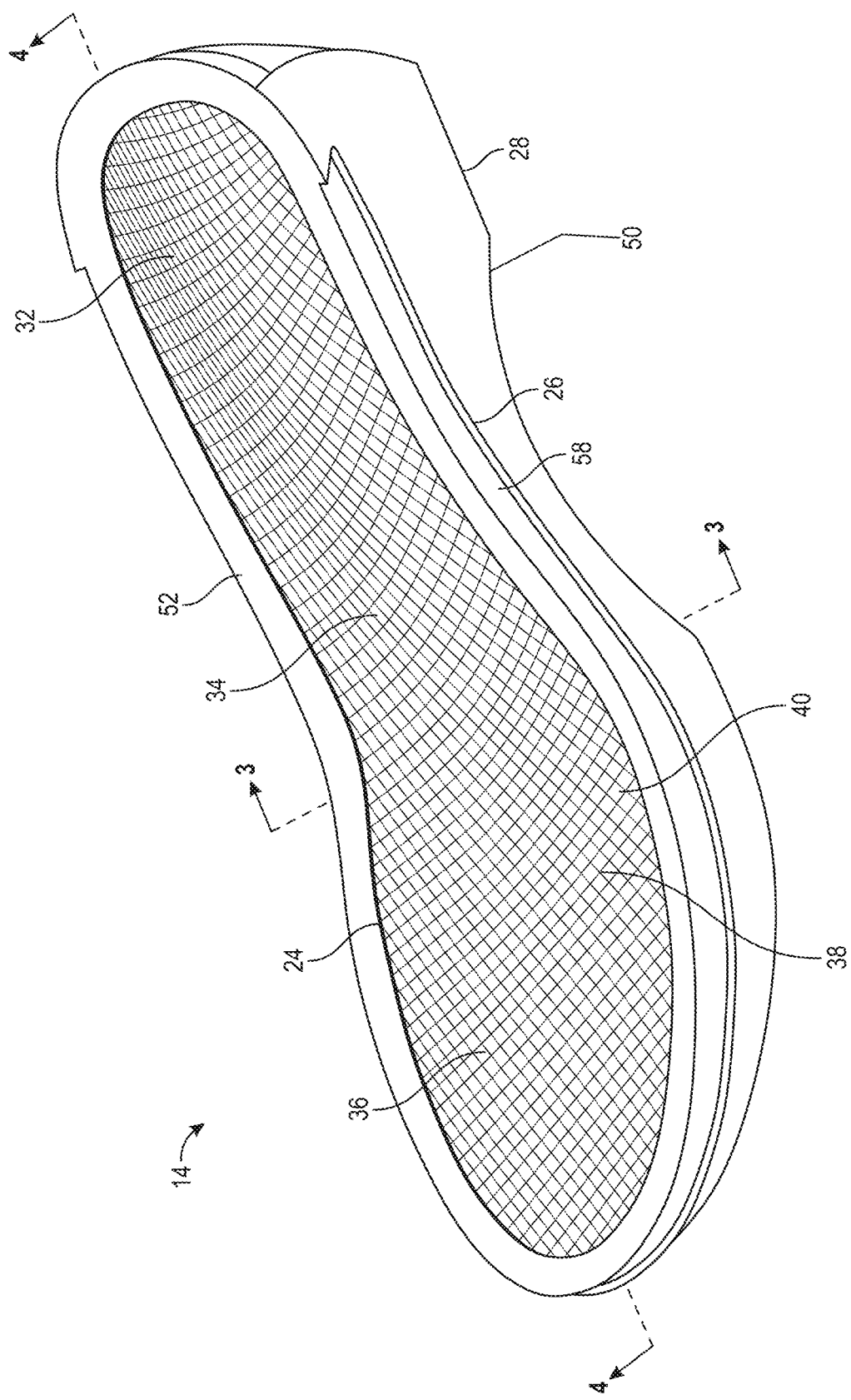
FIG. 2 is an isometric view of a sole assembly shown removed from the upper of the footwear assembly of FIG. 1A.
Figure 3:
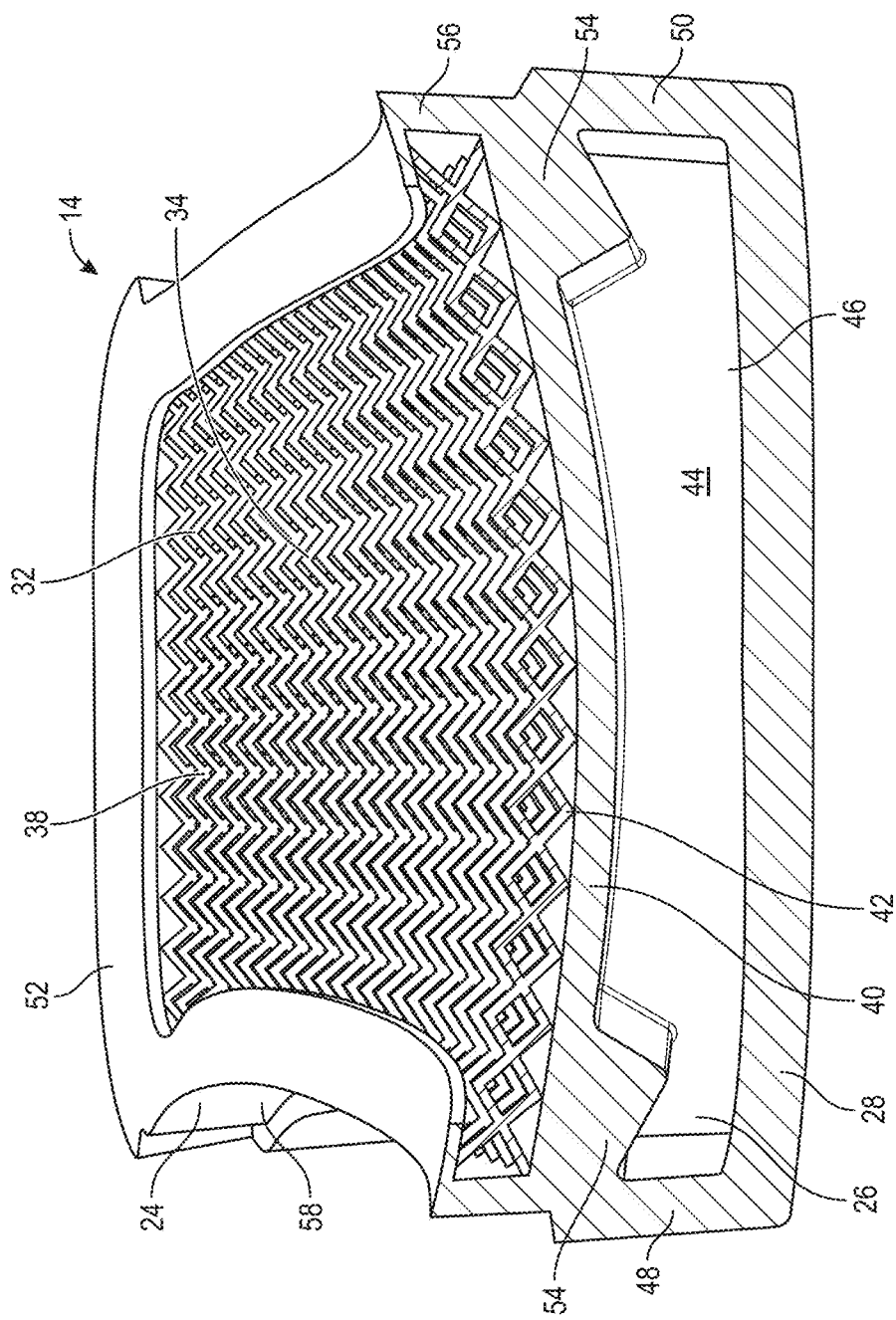
FIG. 3 is a cross-sectional view taken substantially along line 3-3 of FIG. 2.
Figure 4:
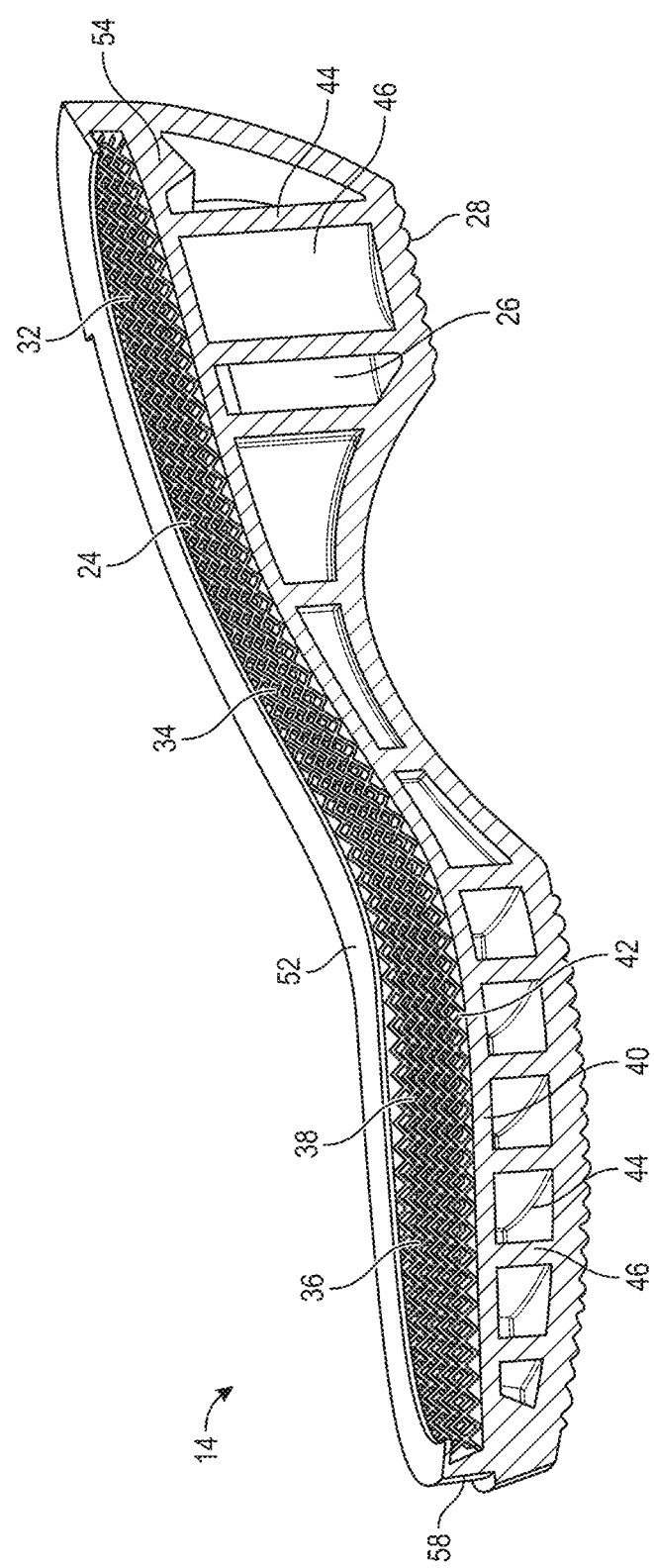
FIG. 4 is a cross-sectional view taken substantially along line 4-4 of FIG. 2.

FIG. 2 is an isometric view of the sole assembly 14 shown with the upper removed, and FIGS. 3 and 4 are cross-sectional views of the sole assembly taken substantially along lines 3-3 and lines 4-4, respectively, of FIG. 2. The sole assembly 14 is configured to support the foot of a wearer atop an insole portion 24, which is coupled to a midsole portion 26. An outsole portion 28 is coupled to the bottom area of the midsole portion 26 and defines a durable ground-engaging bottom surface. In some embodiments, a sock liner 30 (FIG. 1B) can be positioned over the insole portion 24 to form the upper surface that engages the wearer's foot. In the illustrated embodiment, the sole assembly 14 is a full-foot assembly with a heel portion 32, an arch portion 34 forward of the heel portion, and a forefoot portion 36 forward of the arch portion. In other embodiments, the sole assembly 10 can have a sectional construction with a heel section coupled to one or more forefoot sections via a spanning arch structure or the like.

The insole portion 24, the midsole portion 26, and/or the outsole portion 28 can be made via 3-D printing and/or other additive manufacturing process. As discussed in greater detail below, the insole portion 24, the midsole portion 26, and the outsole portion 28 can be made via additive manufacturing, such as a selective laser melting (SLM), selective laser sintering (SLS), electron beam melting (EBM), or other power bed fusion technique or other additive manufacturing techniques to form an integral, unitary sole assembly 14. The sole assembly 14 can be made of a recycled and/or recyclable material. In some embodiments discussed below, the insole portion 24 and the midsole portion 26 are formed or otherwise made together and integrally connected to each other as a unitary component assembled with the outsole portion 28, which is made separately via additive manufacturing. In other embodiments discussed below, the midsole portion 26 is integrally formed and connected with the outsole portion 28 as a unitary component, and the insole portion 24 is formed separately and attached to the top of the midsole portion 26 during assembly. This manufacturing process decreases the number of separate parts that need to be assembled to construct the sole assembly 14, thereby simplifying the assembly process, decreasing the number of parts for the assembly, reducing assembly time, and decreasing the cost of the footwear assembly 10 (FIG. 1).

As seen in FIGS. 3 and 4, the insole portion 24 of the illustrated embodiment has an integral lattice 38 coupled to a platform layer 40. The lattice 38 comprises a plurality of interconnected laths 42 extending away from the platform layer 40. The laths 42 are provided at least in the heel portion 32 and the forefoot portion 36 (FIG. 4), such that the lattice 38 and the platform layer 40 support the foot of the wearer atop the insole portion 24. The laths 42 are configured to flex or bend to provide cushioning to the wearer's foot at the insole portion 42. In the illustrated embodiment, the insole portion 24 has a full foot lattice 38 and platform layer 40 construction through the heel, arch, and forefoot portions 32, 34, and 36 (FIG. 4). The platform layer 40 can be a single integral component, or it can be formed by a plurality of segments in the heel, arch, or forefoot portions 32, 34, and 36. In some embodiments, the platform layer 40 can be provided in just the heel portion 32, or the arch portion 34, or the forefoot portion 36, or any combination of these portions.

The platform layer 40 can be solid, or it can include a plurality of apertures, which reduces weight and facilitates removal of excess material, such as powder or other material used in the additive manufacturing process. For example, the platform layer 40 and/or the lattice 38 are configured to allow pressurized air or other cleaning medium to remove the excess material from the insole portion 24 prior to final assembly of the sole assembly 14 and/or the footwear assembly 10 (FIG. 1B). The illustrated embodiment has the lattice 38 extending upwardly from the platform layer 40, so the lattice 38 will be between the wearer's foot and the platform layer 40. Accordingly, the platform layer 40 is supported on the midsole portion 26. In other embodiments discussed below, the insole portion 24 can be inverted with the platform layer 40 above the lattice 38, so the laths 42 extend downwardly away from the platform toward the midsole portion 26.

In some embodiments, the lattice 38 can define the uppermost surface of the sole assembly 14, so the wearer's foot rests directly on the lattice 38. In other embodiments, a sock liner 30 (FIG. 1B) can cover the lattice 38 and be secured to the sole assembly 14. The sock liner 30 can be made by additive manufacturing, although in other embodiments the sock liner can be made of other materials, such a leather, cloth, synthetic materials, etc. The sock liner 30 is secured to the perimeter portion of the sole assembly 14 so that at least a portion of the sock liner 30 is captured between the edge portion of the upper and the perimeter portion 56 of the sole assembly 14. In other embodiments, the insole portion 24 can have one or more retention features 52 that capture the sock liner 30 atop the insole portion, such as over the lattice 38 and/or over the platform layer. The retention features 52 can include a lip on the periphery of the insole portion 24 that overlaps the sock liner 30 and captures the edges of the sock liner between the lip and the surface of the insole portion 24 supporting the wearer's foot. In some embodiments the sock liner 30 can be captured and held in place under the retention feature 52 via an adhesive or other fastening technique.

As seen in FIG. 3, the midsole portion 26 of the sole assembly has a plurality of internal supports 44 extending between the insole portion 24 and the outsole portion 28. The internal supports 44 are spaced apart from each other to define cavities 46 within the interior of the sole assembly 14. The internal supports 44 are positioned at least in the heel portion 32 and/or the forefoot portion 36 and are configured to support portions of the insole portion 24. The internal supports 44 of the illustrated embodiment are oriented substantially vertically and extend between lateral and medial sidewalls 48 and 50 of the midsole portion. In other embodiments, some or all of the internal supports 44 can extend in the fore/aft direction. The internal supports 44 are shaped, sized, and arranged so they can also bend or flex to provide additional cushioning to the wearer's foot, in addition to the cushioning from the lattice 38. The midsole portion 26 and the internal supports 40 can have different configurations in different portions of the midsole portion 26, so as to provide different levels of cushioning. For example, the internal supports 44 in the heel portion 32 can be configured to provide a greater degree of cushioning in the heel portion 32 to accommodate the loads during the heel strike phase of a gait cycle, and the internal supports 44 in the forefoot portion 36 can provide less cushioning. In some embodiments, the internal supports 44 may only be provided in the heel portion 32 for cushioning during heel strike.

The internal supports 44 and the cavities 46 can be located to help control the flex of the sole assembly 14 through a gait cycle as the wearer walks or runs. The internal supports 44 and cavities 46 can form flex grooves for controlled bending of the sole assembly 14 at locations corresponding to selected portions of the wearer's foot, such as in the metatarsal area over the forefoot portion 28. The cavities 46 can provide integral hollow areas within the midsole portion 26 for a lightweight sole assembly 14. Accordingly, the footwear assembly 10 may have an external appearance of a shoe style, such as a clog that typically is heavy, not flexible, and provides virtually no cushioning. The sole assembly 14 of the present technology, however, allows the sole assembly 14 to be 3-D printed to look like a clog, while still being lightweight, flexible, and with controlled flexibility.

As seen in FIG. 3, the sole assembly 14 of the illustrated embodiment has a plurality of interior anchor features 54 located around the perimeter portion 56 of the sole assembly 10. In the illustrated embodiment, the anchor features 54 are positioned inwardly adjacent to the side walls of the midsole portion 26 and/or the perimeter of the insole portion 24. The anchor features 54 are configured to allow the upper 12 (FIG. 1A) to be securely fastened to the sole assembly 14 even though portions of the midsole inwardly adjacent to the sidewalls are hollow. The anchor features 54 provide integral, internal structure into which fasteners 23 (FIG. 1B), such as staples, nails, rivets, or the like, can be embedded without penetrating into the cavities 46. In the illustrated embodiment, the anchor features 54 are integrally connected to the perimeter of the insole portion under the platform layer 40. In another embodiment, the anchor features 54 may be integrally connected to the inner surface of the midsole's sidewalls, such that the fasteners 23 can secure the lower portion 18 of the upper 12 (FIG. 1A) to the sole assembly 14 by extending through the material of the upper, through the midsole's sidewall, and being fully embedded into the anchor features 54. In yet other embodiments, the integral anchor features 54 can be coupled to the perimeter of the insole portion 24 to allow the lower portion of the upper to be stitched to the insole portion 24. In other embodiments, the upper 12 may be attached at least part of the sole assembly 14 via a string or cable to so as to tension the attachment either directly, or via the internal voids of the sole assembly or via the anchor features discussed in greater detail below. In some embodiments, the upper may attached to at least a portion of the sole assembly by "string lasting," to that the string or cable or other tensioning line is configured to overlast to the upper over the associated portion of the sole assembly. Aspects of string lasting are disclosed in U.S. Patent Application Publication No. 2021/033003, titled System and Methods for Lasting an Upper to a 3D Printed Platform, filed Apr. 23, 2021, which is incorporated herein in its entirety by reference. In some embodiments of the present technology, the upper may be strobel stitched and then string lasted directly via lathes of a latticed insole to the sole assembly discussed below. Alternatively, the upper may be overlasted to the sole assembly via engagement with the string (or other tensioning line) in combination of internal or external channels and voids formed on the sole assembly. Other embodiments can utilize a combination of these techniques.

As seen in FIGS. 1A, 2, and 3, the sole assembly 10 has one or more alignment features 58 configured to receive and align the lower portion 18 of the upper 12 along a selected portion of the sole assembly and adjacent to the anchor features 54 (FIG. 3). Accordingly, the lower portion 18 of the upper 12 can be easily and quickly positioned against the sole assembly and aligned with the alignment features 58 so that the fasteners 23 (FIG. 1A) can be attached and embedded into the anchor features, thereby securely affixing the upper 12 to the sole assembly 14. In the illustrated embodiment, the alignment features 58 are integrally formed in at least a portion of the peripheral area of the insole portion 24, so the edge of the upper 12 is laterally aligned with the anchor features 54. In other embodiments, the alignment features 58 can be provided on the midsole portion 26, or in both the insole and midsole portions 24 and 26. The alignment features 58 can be provided on the exterior surface of the insole or midsole portions 24 or 26, or the alignment features 58 can be formed in an interior portion of the insole or midsole portions 24 or 26 and configured to align the upper 12 for connection with the sole assembly 14.

Figure 5:
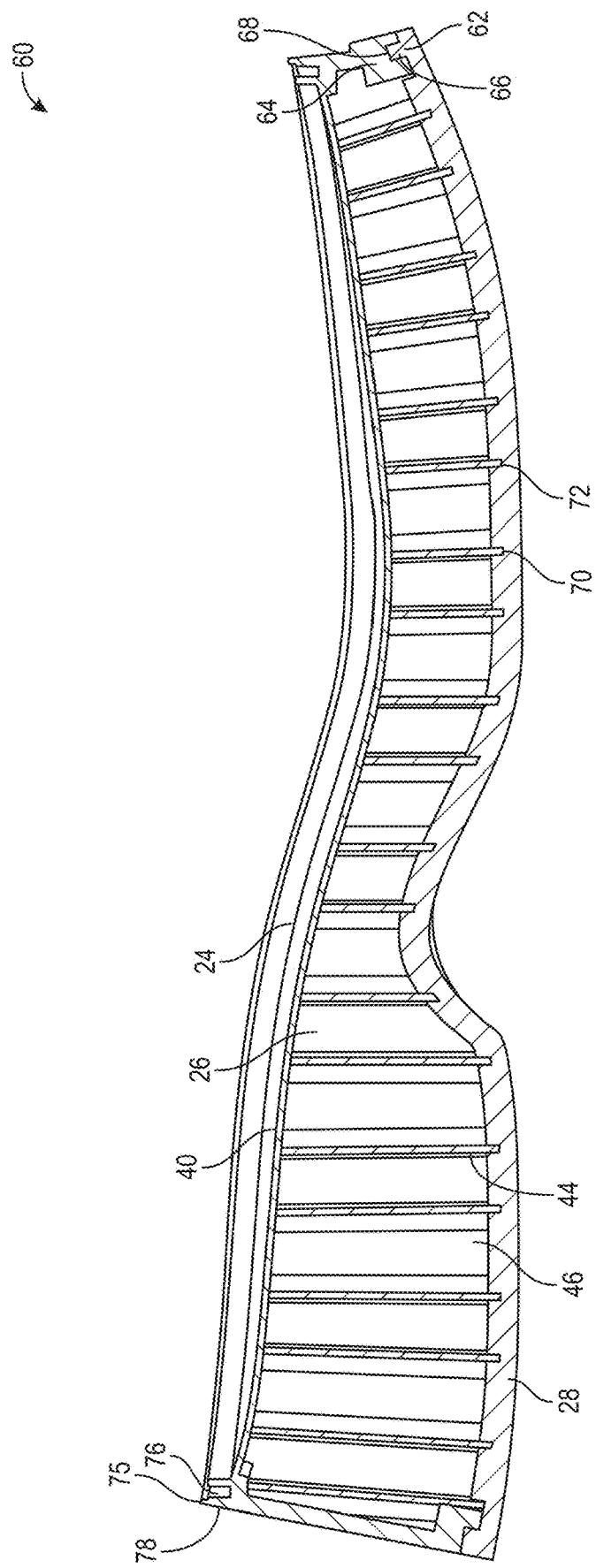
FIG. 5 is a cross sectional view of an alternate embodiment of the sole assembly of FIG. 2.
Figure 6:
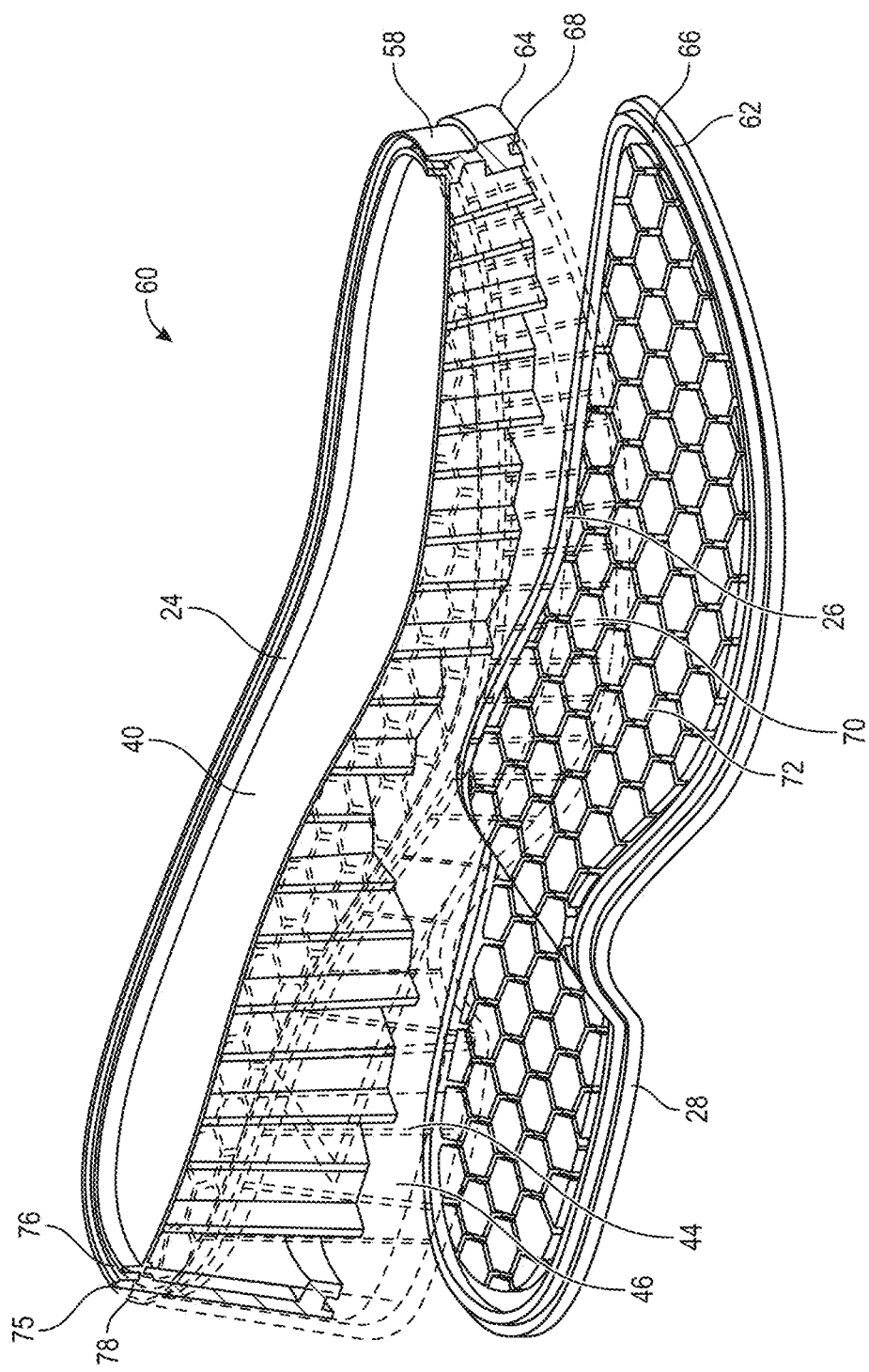
FIG. 6 is partially exploded and translucent isometric view of the sole assembly of FIG. 5.

FIGS. 5 and 6 are cross sectional and exploded isometric views of a sole assembly 60 in accordance with an alternate embodiment of the sole assembly 14 shown in FIG. 2. FIGS. 7A-7D are additional views of the sole assembly 60 of FIG. 5. This sole assembly 60 has the insole portion 24 integrally formed with the midsole portion 26 via, as an example, additive manufacturing. The midsole portion 26 has the internal supports 44 that extend downwardly from the insole portion 24 and that are spaced apart to define the cavities 46. As seen in FIG. 6, the internal supports 44 can be arranged to form honey-comb shaped cavities, although the internal supports 44 can be positioned to form cavities with other shapes, which may or may not be symmetrical or uniform.

The outsole portion 28 is formed, such as via additive manufacturing or another manufacturing technique, as a separate component from the integral insole and midsole portions 24/26. The outsole portion 28 is configured to fixedly attached to the bottom portion of the midsole portion 26, such that the outsole portion 28 extends over and closes the cavities 46. This construction is engineered to control the weight of the sole assembly 10 and also to control the flow of air or other medium in the cleaning process for removal of excess material, such as powder or other material used in the additive manufacturing process. For example, the integral insole/midsole portions 24/26 are configured to allow pressurized air or other cleaning medium to flow into and through the sole assembly components to easily and quickly clear excess powder or other materials from the sole assembly before the insole portion 28 is assembled onto the bottom of the midsole portion 26. In other embodiments, the midsole/insole portions 24/26 can be cleaned by using suction or other vacuuming techniques. The construction of the midsole portion 26 could also be configured to receive a separate material in the cavities 46, such as a foam, a non-Newtonian material, or other cushioning or energy return material. This cushioning or energy-return materials, or a combination of both, could be added at selected locations within the midsole portion 26, such as in the heel or forefoot portions 32 or 36 before the outsole portion 28 is attached and the cavities 46 are closed and sealed.

In the illustrated embodiment, the outsole portion 28 and the bottom of the midsole portion 26 have mating attachment features 62 and 64 extending around at least a portion of their respective perimeters. For example, the attachment feature 62 around the outsole portion 28 includes a projection 66 extending upwardly from the surface of the outsole portion 28. The projection 66 can be a continuous projection or a plurality of segments positioned around the outsole portion 28. The attachment feature 64 on the bottom of the midsole portion 26 has a groove 68 that securely receives the projection 66 in a mating, tongue-and-groove type engagement. While the illustrated embodiment shows the projection 66 on the outsole portion 28, and the groove 68 on the midsole portion 26, in other embodiments the projection 66 may be on the bottom of the midsole portion 26, and the groove 68 can be on the outsole portion 28.

The mating features 62/64 act to precisely align the outsole portion 28 with the midsole portion 26 for easy and quick assembly. In some embodiments, as shown in FIG. 5, the internal supports 44 are shaped, sized, and positioned, so that the bottom edges 70 are received in a plurality of channels 72 formed on the top of the outsole portion 28. The mating features 62/64 and/or the internal supports 44 and channels 72 can be affixed to each other via an adhesive, a close friction fit, a physical mechanical attachment, or a combination of attachment techniques. In another embodiment, as seen in FIGS. 7A-7D, the internal supports 44 of the midsole portion 26 are shaped, sized, and positioned so that their bottom edges 70 engage the top surface outsole portion 28 without fitting into mating channels.

Figure 7A:
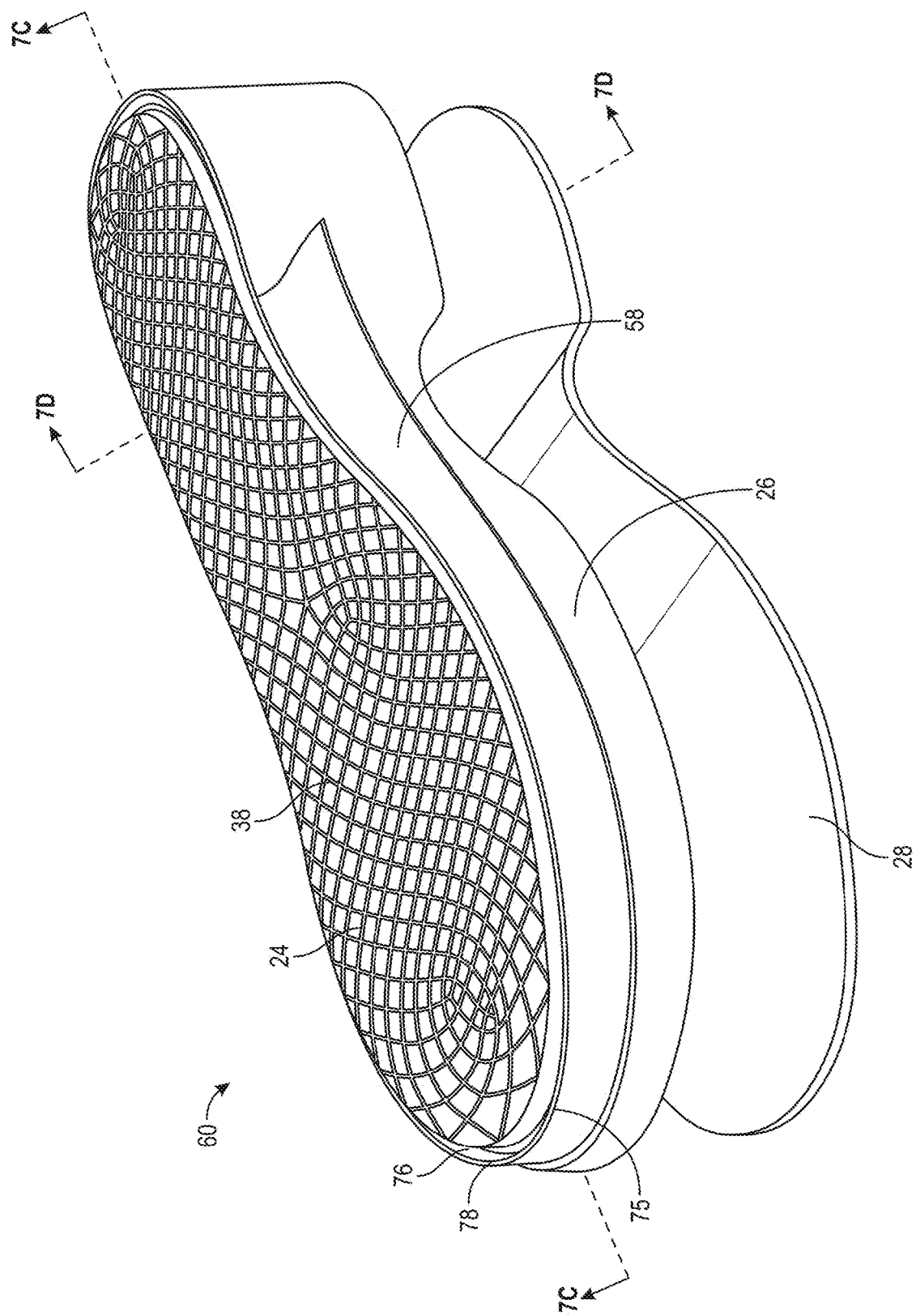
FIGS. 7A and 7B are partially exploded isometric views of a sole assembly of another embodiment of the present technology.
Figure 7B:
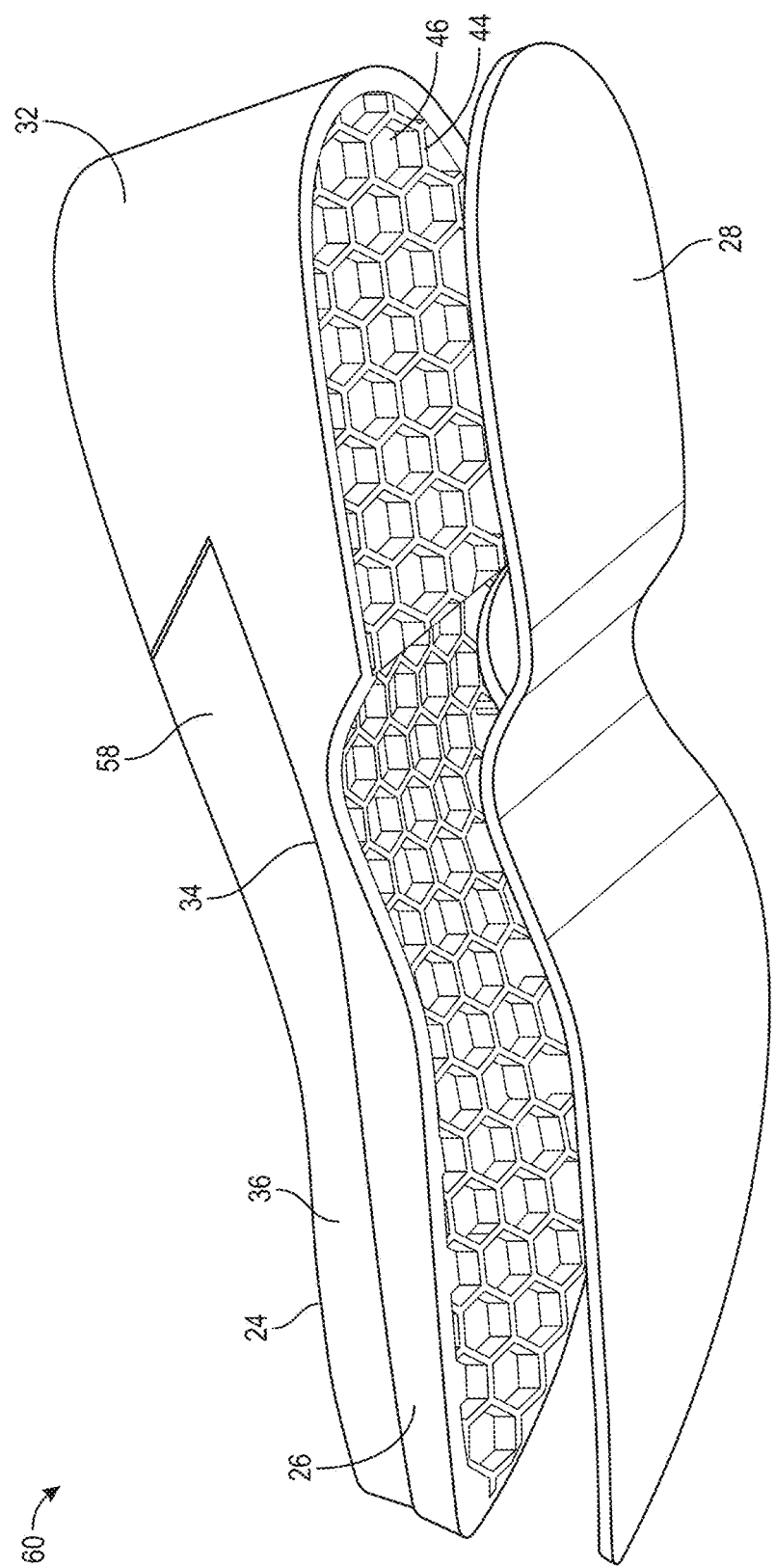
Figure 7C:
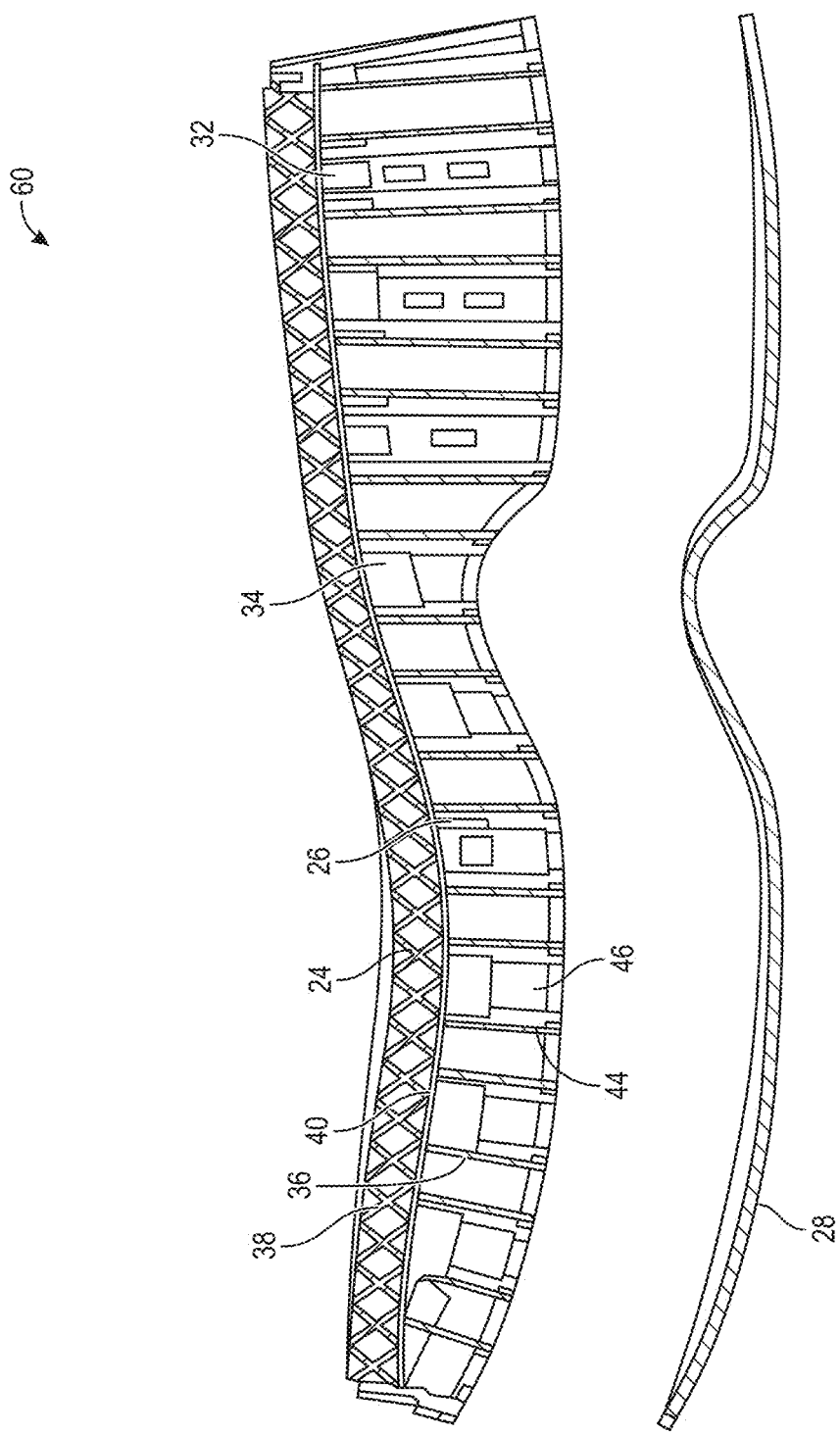
FIGS. 7C and 7D are cross-sectional views of taken substantially along lines 7C-7C and 7D-7D, respectively, of FIG. 7A.
Figure 7D:
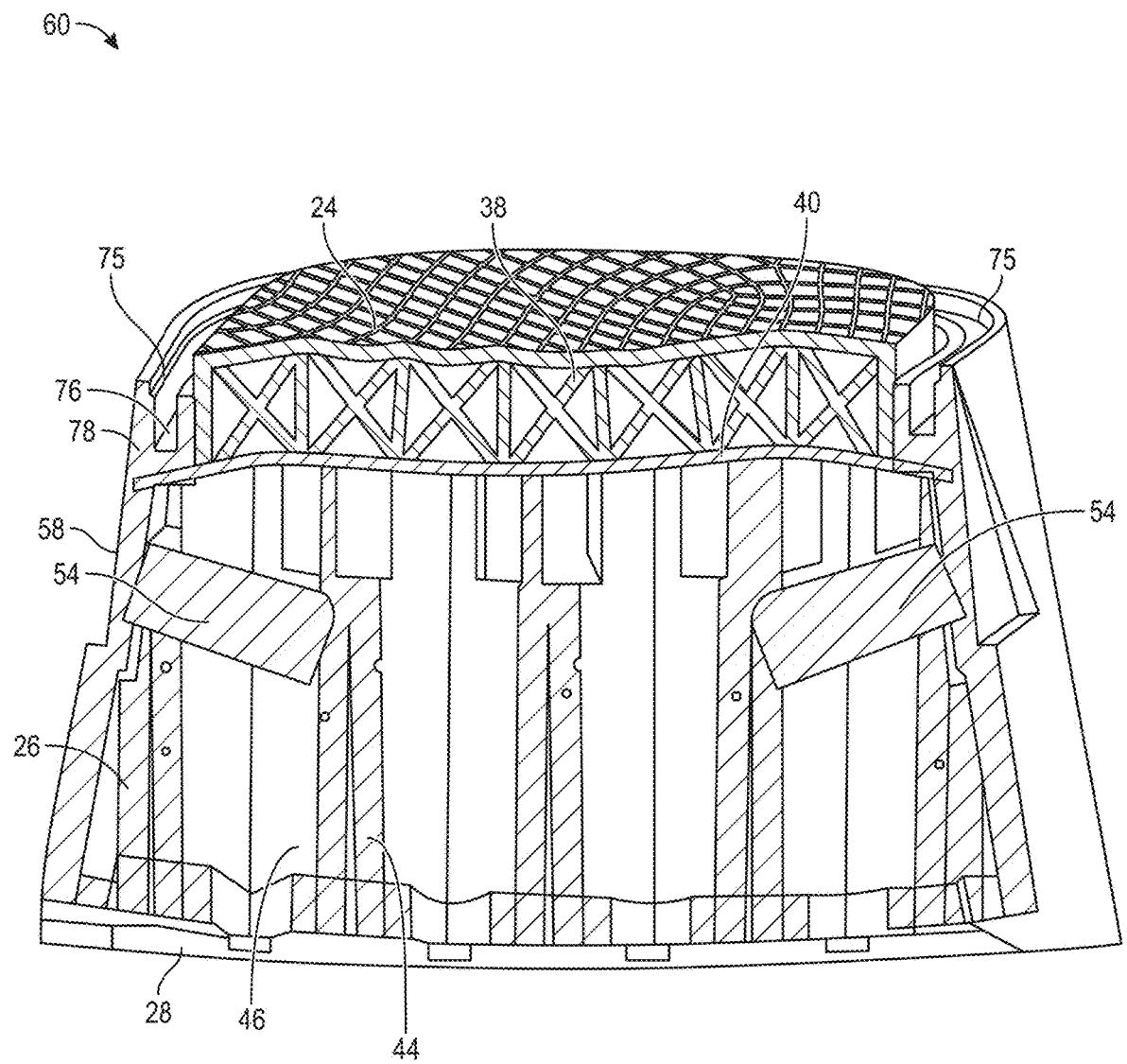
Figure 8A:
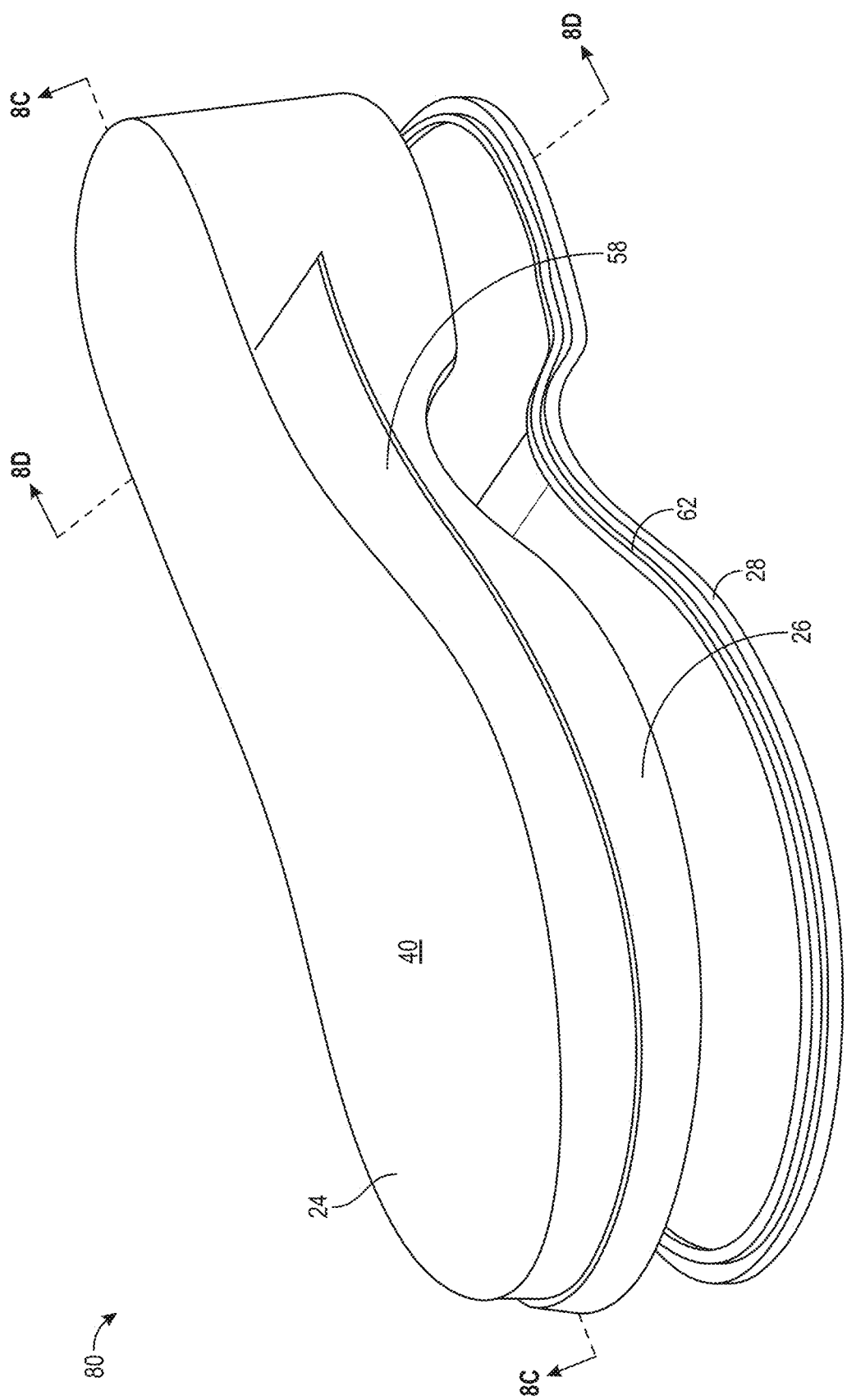
FIGS. 8A and 8B are partially exploded isometric views of a sole assembly of an embodiment of the present technology.
Figure 8B:
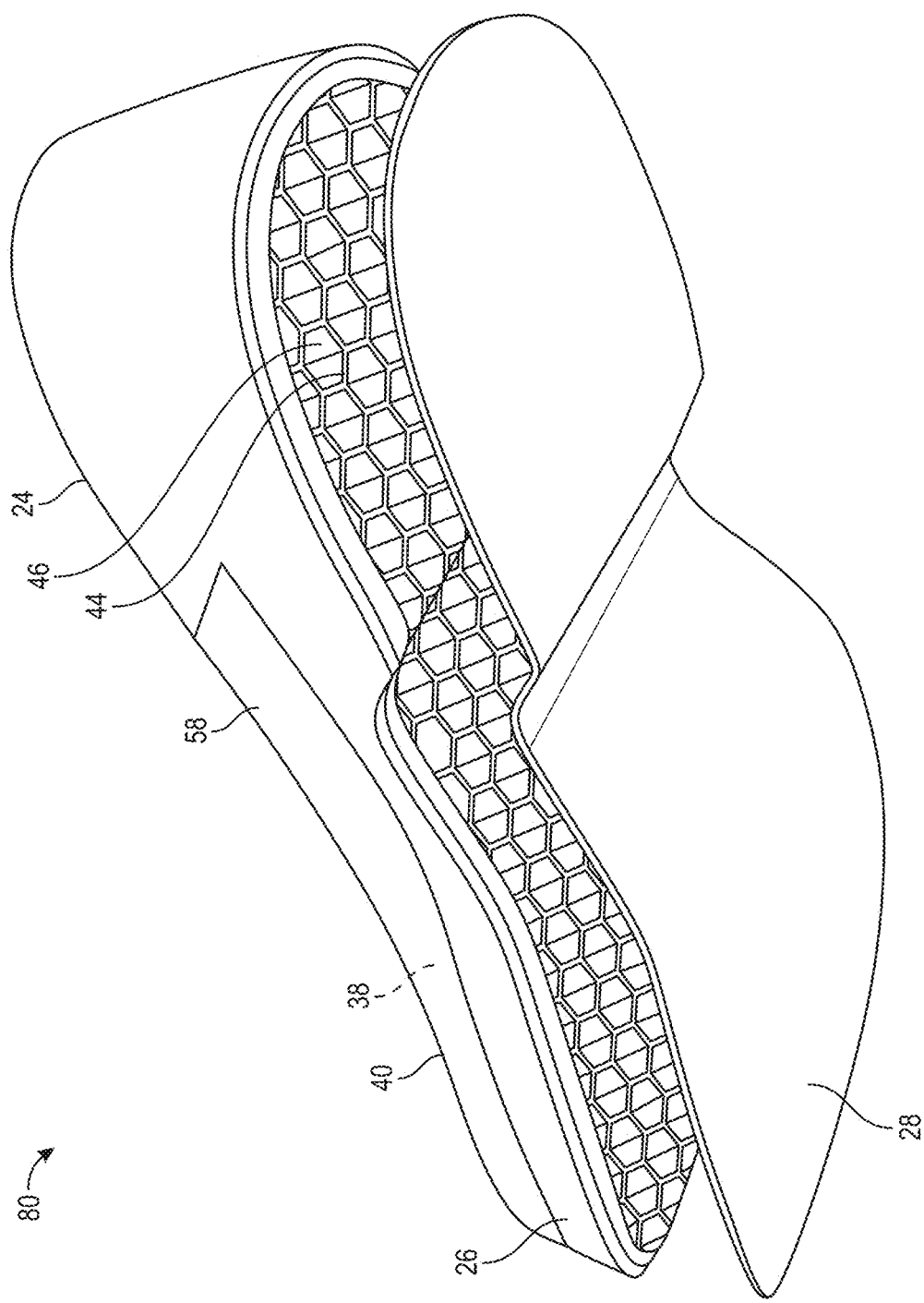
Figure 8C:
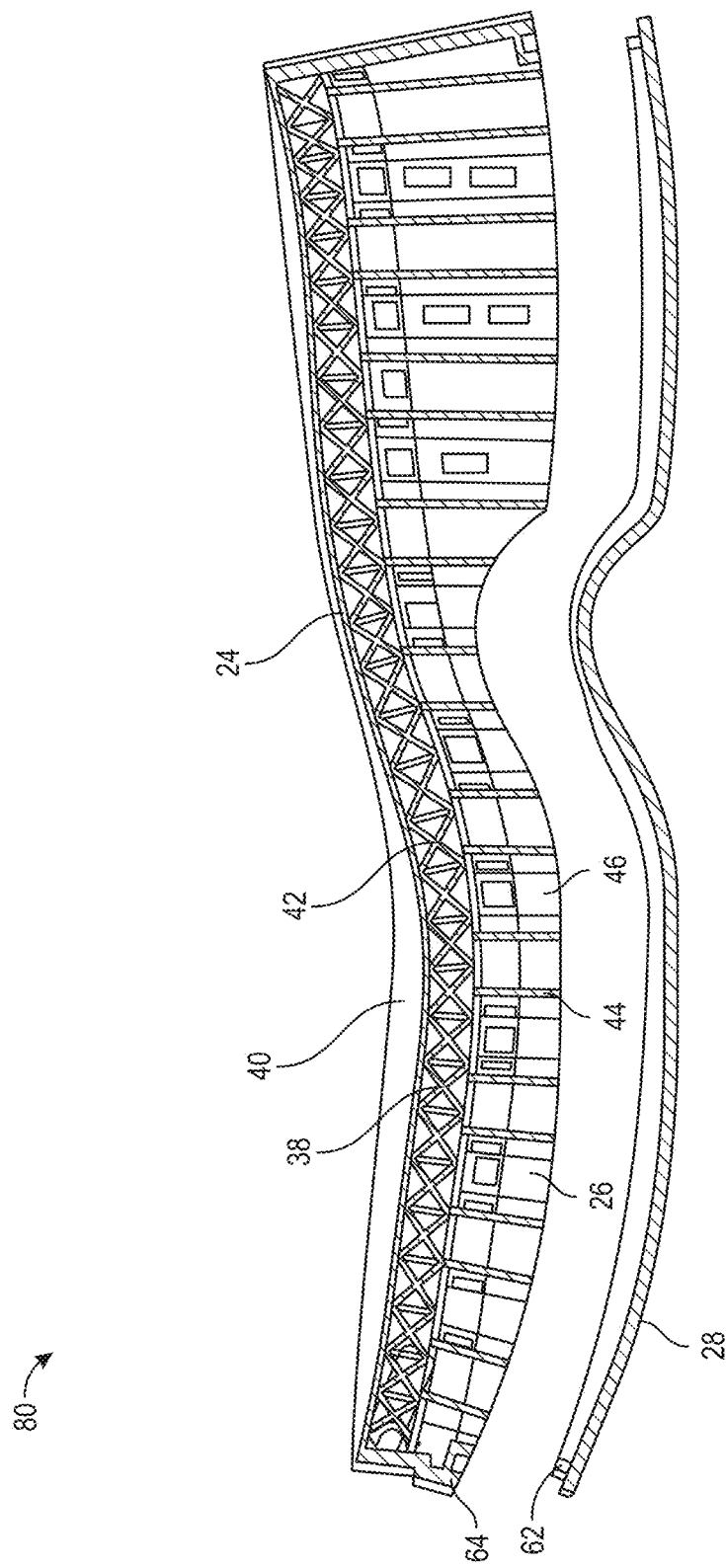
FIGS. 8C and 8D are cross-sectional views of taken substantially along lines 8C-8C and 8D-8D, respectively, of FIG. 8A.
Figure 8D:
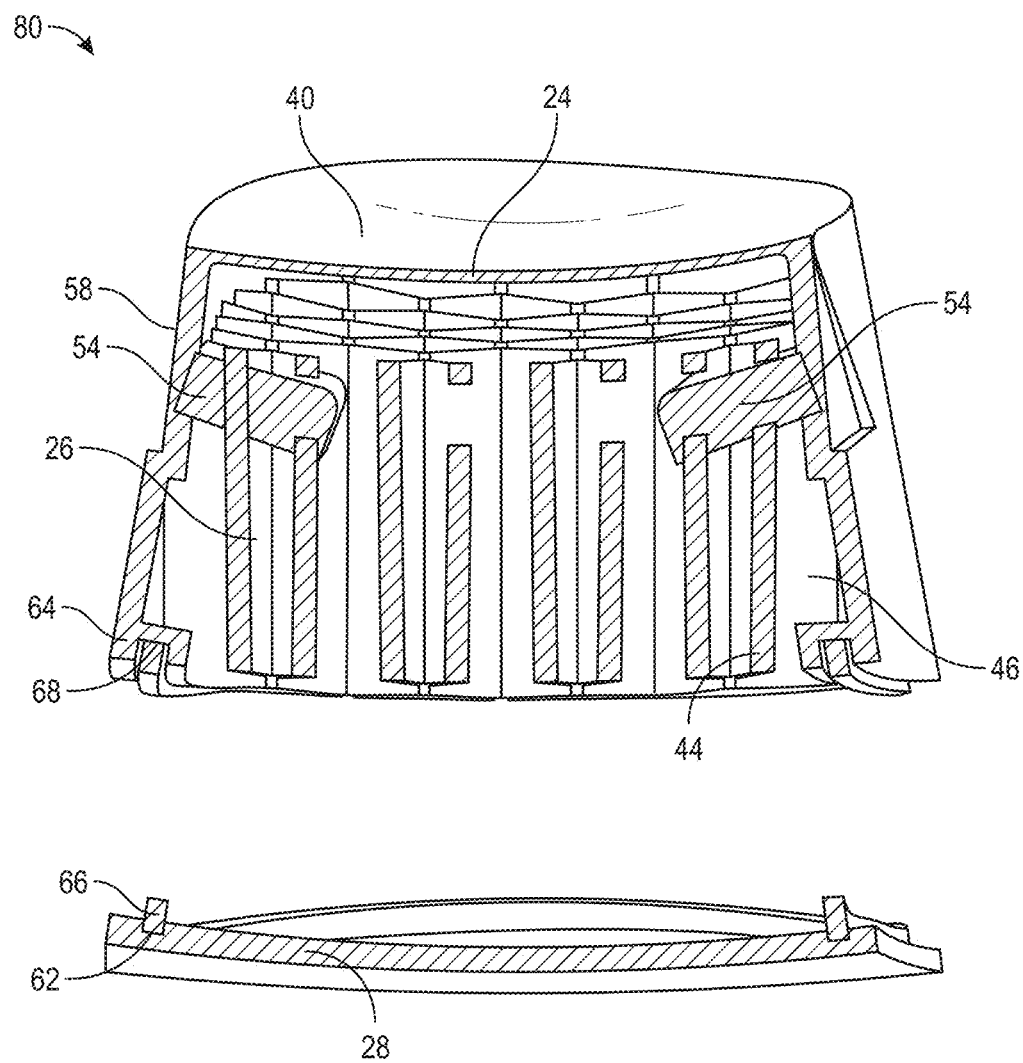

In the embodiment illustrated in FIGS. 7A-7D, the insole portion 24 integrally formed with the midsole portion can include a platform layer 40 with the lattice 38 atop the platform layer 40 to form a foot-supporting surface. In other embodiments, the insole portion 24 may not include the lattice, such as shown in FIG. 5. The upper perimeter of the insole portion 24 can include an attachment feature 75, such as a groove 76 between a pair of flanges 78, that receives the lower portion 18 of the upper 12 (not shown). This attachment feature 75 can be used to affix the sock liner on the insole portion over the lattice. The sock liner can be fastened to the insole portion 24 via stitching, adhesive, fasteners, or other attachment technique. This construction provides for a very strong, quick, and inexpensive installation of the sock layer onto the insole portion 24. As seen in FIGS. 7A and 7D, the midsole portion 26 has the alignment feature 58 configured to receive and align the upper 12 on the sole assembly 14, such that the fasteners can extend through the upper, through the sidewall of the midsole and be embedded into the anchor features 54 (FIG. 7D) without projecting into the cavities 46.

FIGS. 8A-8D are partially exploded isometric and cross-sectional views of a sole assembly 80 in accordance with another embodiment of the present technology. The sole assembly 80 has a similar construction as the sole assembly 60 as discussed above with the integral, unitary insole portion 24 and midsole portion 26 that attaches to the separate outsole portion 28. The primary difference between these embodiments, however, is the construction of insole portion 24. In this embodiment, the integral insole portion 24 is constructed with the platform layer 40 above the lattice 38. The lathes 42 (FIGS. 8C and 8D) of the lattice 38, extend downwardly and are supported atop the midsole portion 26, including by the internal supports 44. The platform layer 40 can be constructed so its top surface is configured to support the wearer's foot. Accordingly, a sock liner may not be assembled over the insole portion, such that the insole portion 24 does not include an attachment feature, such as the groove and flanges 74 and 76 shown in FIGS. 7A and 7D, around the perimeter of the insole portion 24.

FIGS. 9A-9D are partially exploded isometric and cross-sectional views of a sole assembly 90 of an embodiment of the present technology. FIG. 10 is the cross-sectional view of the sole assembly 90 of FIG. 9B in a non-exploded view. In this embodiment, the insole and midsole portions 24 and 26, respectively, of the sole assembly 90 are integrally printed or otherwise additively manufactured as a unitary structure, and the outsole portion 28 is separately printed or otherwise formed. Accordingly, the bottom of the midsole portion 26 is initially open and accessible before the outsole portion 28 is attached, so any excess powder or other material used in the additive manufacturing process can be removed from the cavities 46 and/or the lattice, such as via pressurized air or other fluid, or by suction or other vacuuming technique. The outsole portion 28 is joined to the bottom of the midsole portion via mating attachment features 92 (FIGS. 9B and 9D) positioned around the perimeters of the midsole and outsole portions 26 and 28, respectively. In the illustrated embodiment, the attachment feature 92 on the outsole portion 28 is formed by a plurality of hook flanges 94 extending upwardly from the upper surface of the outsole portion 28. In the illustrated embodiment, the hook flanges 94 comprise a plurality of hook flange segments positioned around the perimeter of the outsole portion 28. In other embodiments, the hook flanges 94 can be a single unitary feature around the outsole's perimeter.

The mating attachment feature on the bottom of the midsole portion 26 is a hooked lip 96 configured to extend over and be captured by the hook flanges 94, as shown in FIG. 10. When the outsole portion 28 is being assembled with the insole/midsole portions, the outsole portion 28 and midsole portion 26 are aligned and pressed together. The hooked lip 96 slides over the hook flanges 94, causing the hook flanges 94 to slightly deflect and then snap into position over the hooked lip 96, thereby capturing the hooked lip under the hook portions of the flanges 94. Accordingly, the outsole portion 26 can be quickly and easily assembled with the insole/midsole portions 24/26 by snapping the outsole portion 28 in place manually or via automated equipment. While the illustrated embodiment utilizes a mating hook arrangement, other attachment features can be used to easily and quickly connect the outsole portion 28 to the bottom of the midsole portion 26 during formation of the sole assembly 90.

Figure 9A:
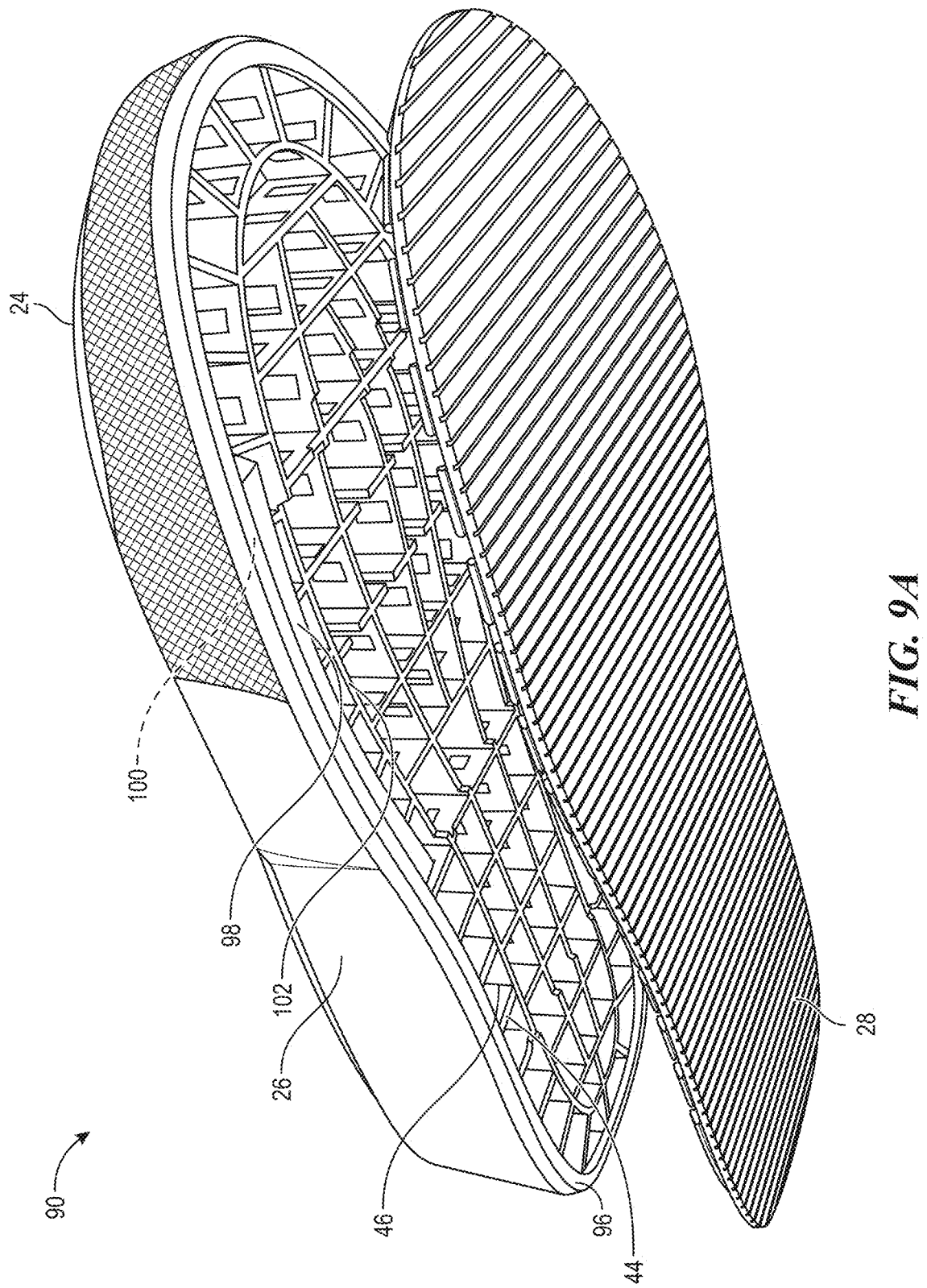
FIG. 9A is a partially exploded plan view of a sole assembly of another embodiment of the present technology.
Figure 9B:
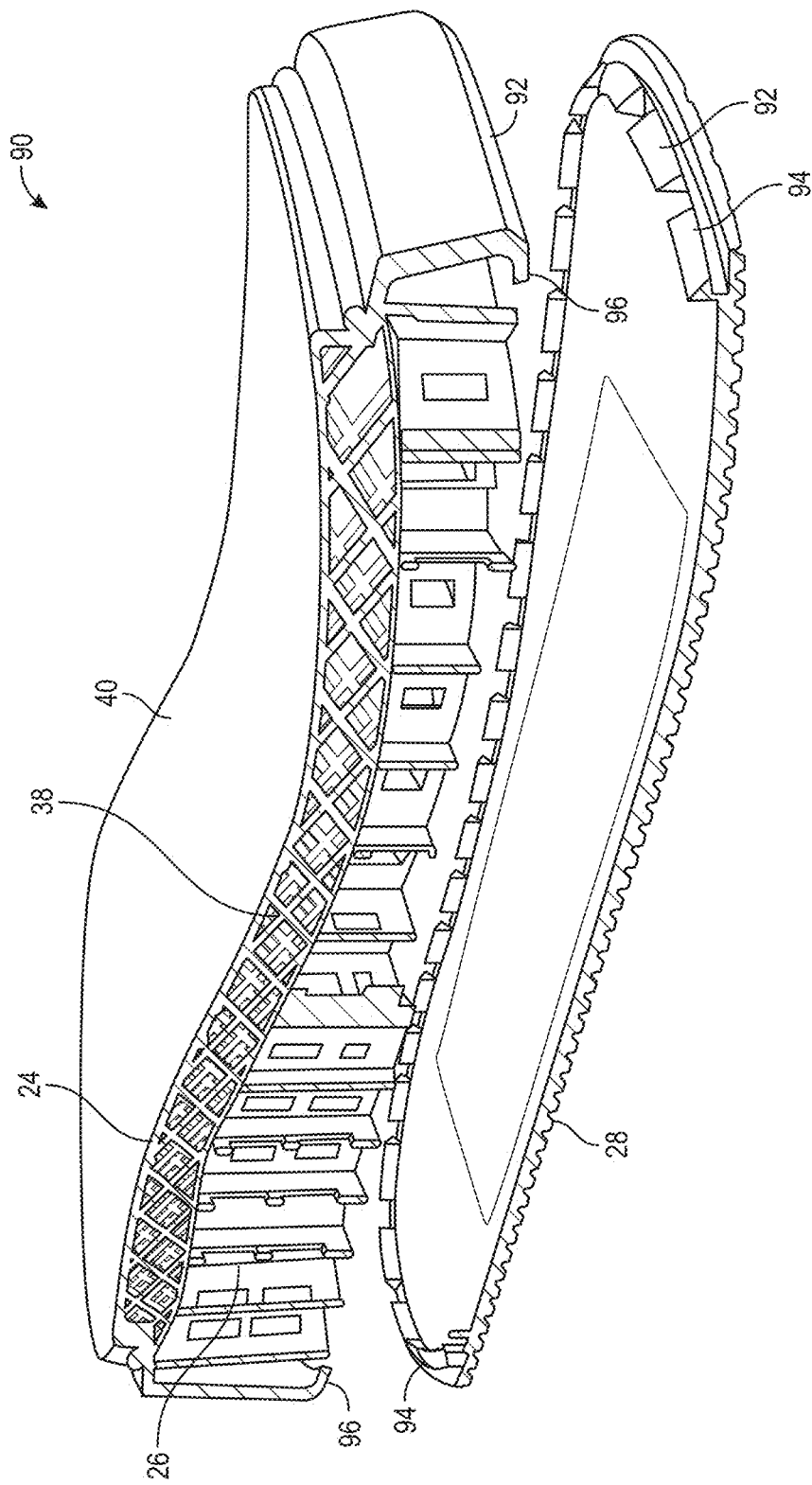
FIGS. 9B-9D are partially exploded cross-sectional views of the sole assembly of FIG. 19A.
Figure 9C:
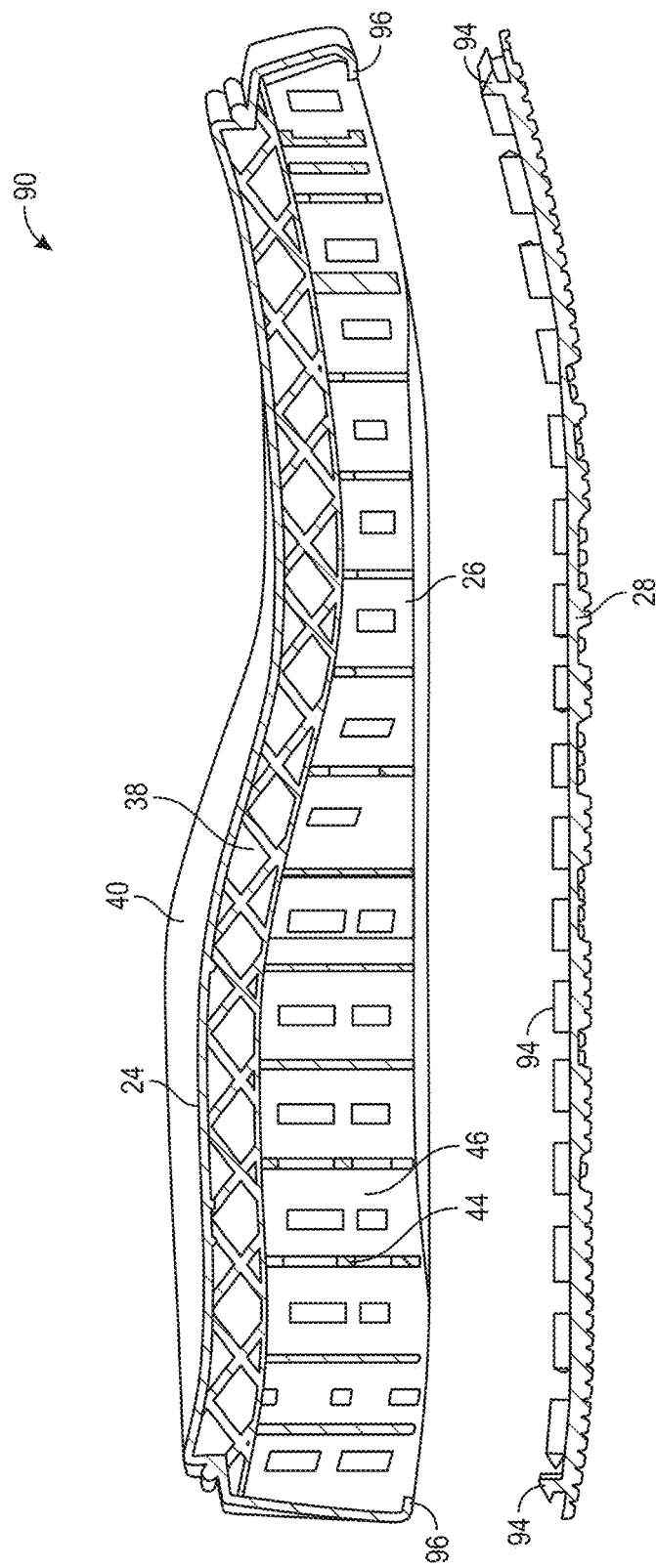
Figure 9D:
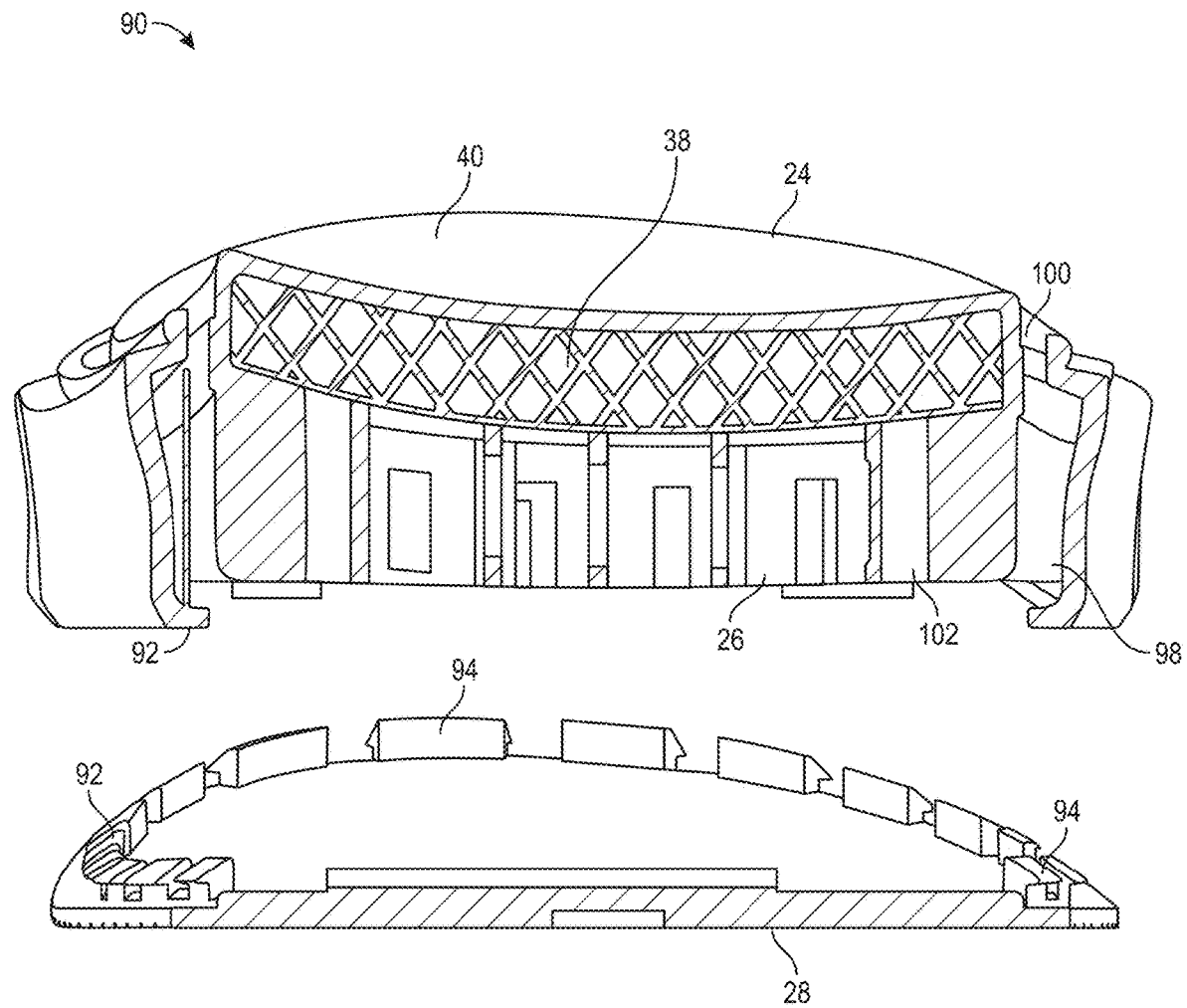
Figure 10:
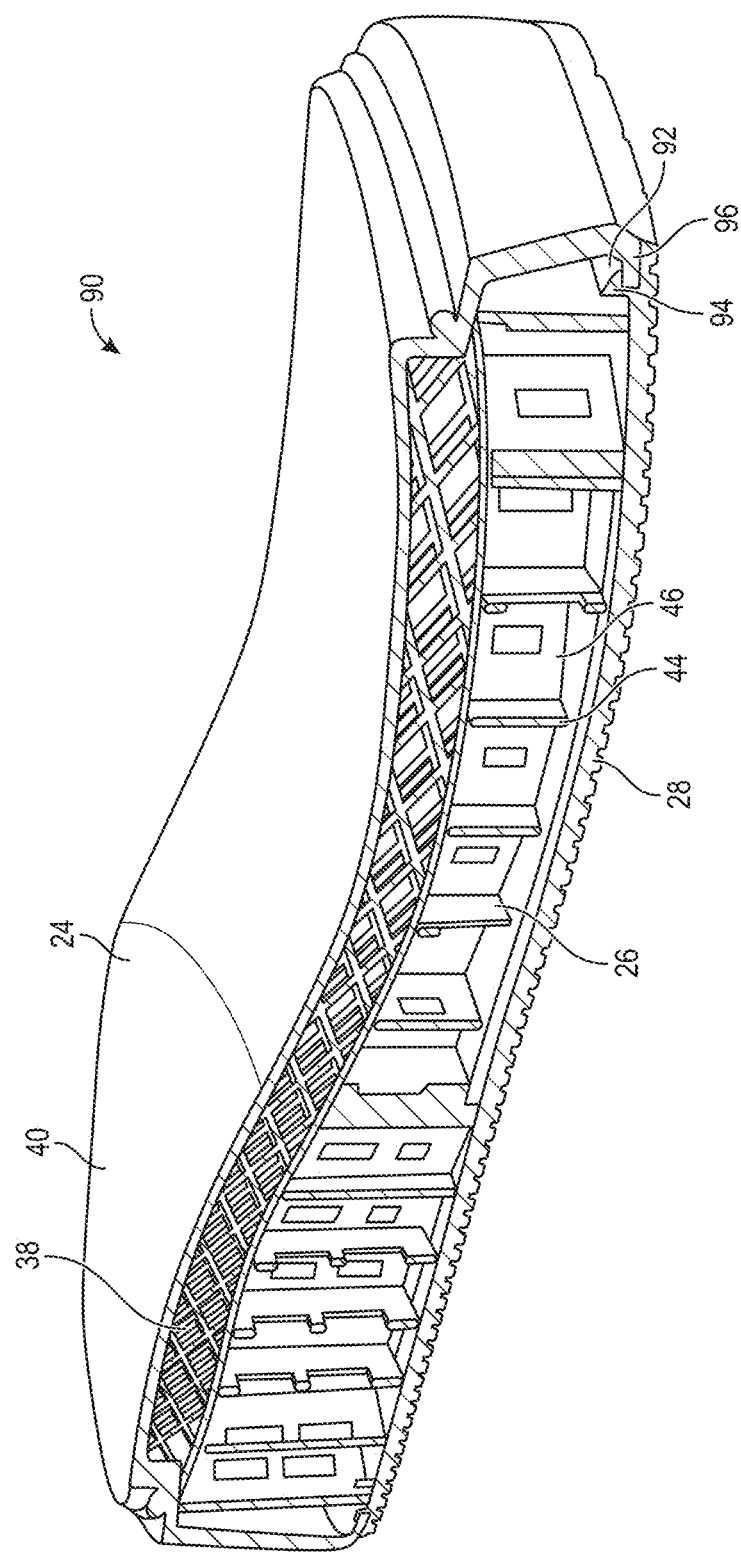
FIG. 10 is a cross-sectional view of the sole assembly of FIG. 10B shown in a non-exploded view.

As seen in FIGS. 9A and 9D, the sole assembly 90 has an internal alignment feature 98 configured to receive and align a lower portion of the upper 12 (not shown) for attachment to the insole/midsole portions 24/26. In the illustrated embodiment, the insole portion 24 and midsole portion 26 are configured to provide an open slot 100 between the edge of the insole portion 24 and the sidewall of the midsole portion 26. The slot 100 can receive a portion of the upper, so as to align the upper relative to the sole assembly for final attachment. The bottom of the midsole portion 26 can also have a recessed area 102 or other shaped portion that receives and aligns an edge of the upper, such that the that the upper extends through the slot 98, wraps around the midsole portion 26 and is received in the recessed area 102. The aligned upper can then be securely fixed in place, such as by fasteners, adhesive, or other suitable joining techniques. Once the upper is attached to the insole/midsole portions 24/26, the outsole portion 28 can be snapped onto the bottom of the midsole portion 26, as discussed above. This construction with the slot 100 and recessed area 102 are particularly well suited for an upper formed by straps, such as a sandal, a slide, or other open-toe style footwear. This construction, however, can be used for other upper configurations or styles of footwear.

FIGS. 11A-11D are partially exploded isometric and cross-sectional views of a sole assembly 110 in accordance with another embodiment of the present technology. In this embodiment, the midsole portion 26 can be integrally printed or otherwise additively manufactured with the outsole portion 28, and the insole portion 24 is separately printed or otherwise formed. The bottom of the cavities 46 of the midsole portion 26 are closed by the outsole portion 28, and the top of the cavities 46 are open until the insole portion 24 is attached atop the midsole portion 26. In the illustrated embodiment, the cavities 46 have a honey-comb shape, but the cavities 46 in other embodiments can be different shapes, sizes, or configurations. In the illustrated embodiment, the separate insole portion 24 is constructed with the lattice 38 (FIG. 11C) extending downwardly from the platform layer 40 and is supported atop the internal supports 44 of the midsole portion 26. In other embodiments, the insole portion 24 can have an inverted arrangement with the lattice 38 extending upwardly from the platform layer 40. The access to the open cavities 46 and the lattice 38 before the insole and midsole portions 24 and 26 are joined allows for the easy and quick removal of excess powder or other material through the top of the midsole portion 26 and the bottom of the insole portion 24, respectively.

Figure 11A:
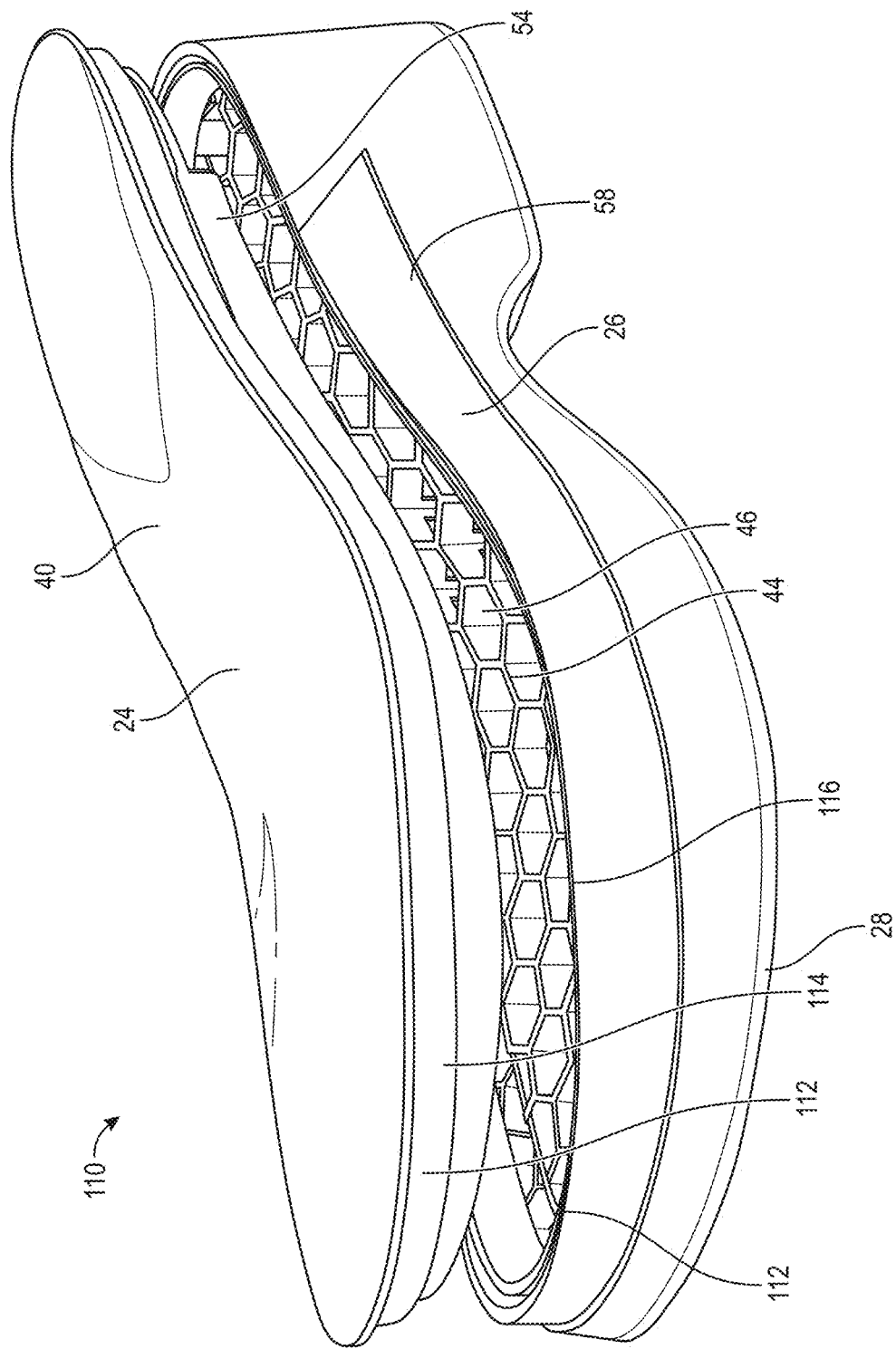
FIGS. 11A and 11B are partially exploded isometric views of a sole assembly of another embodiment of the present technology.
Figure 11B:
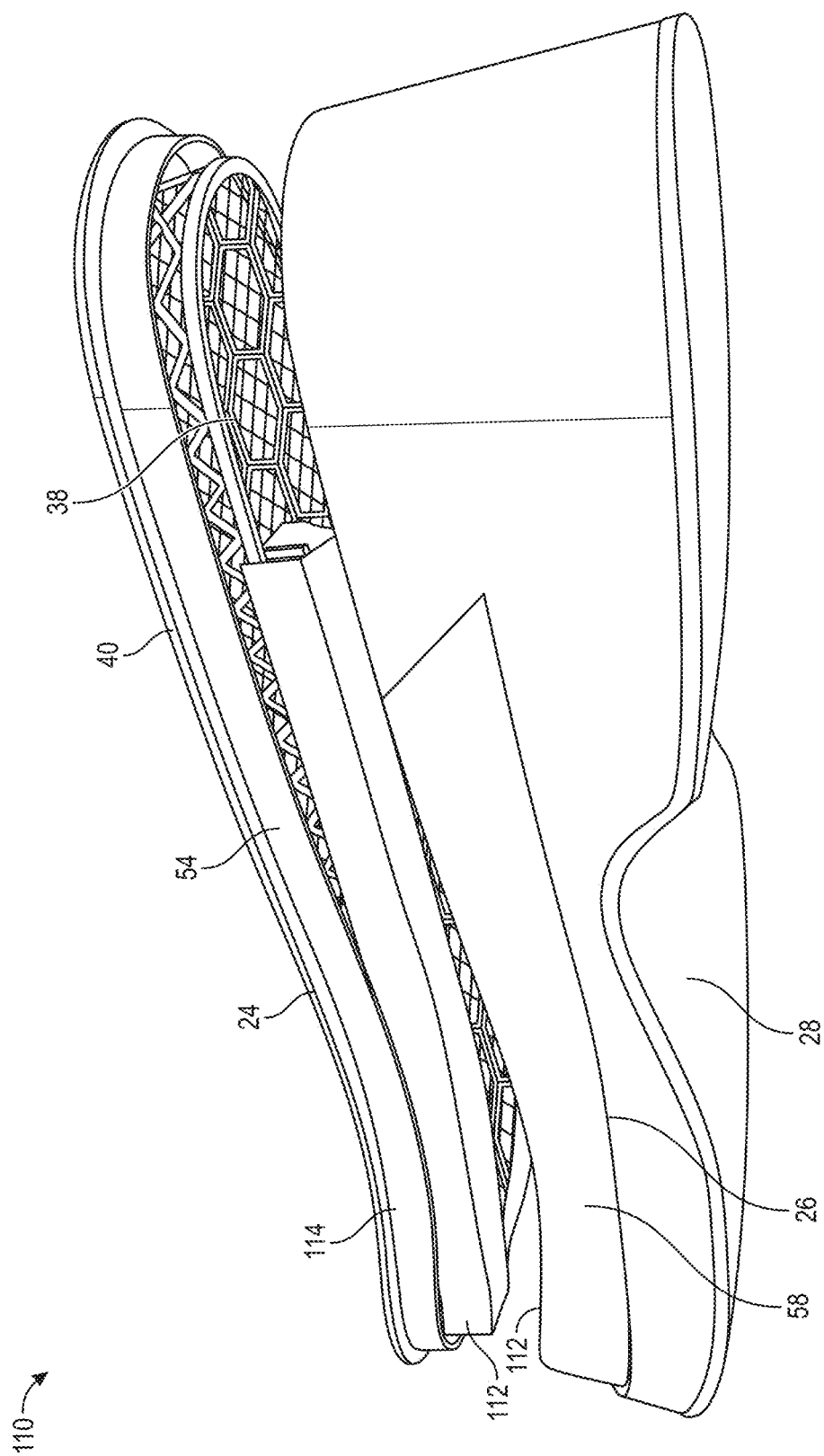
Figure 11C:
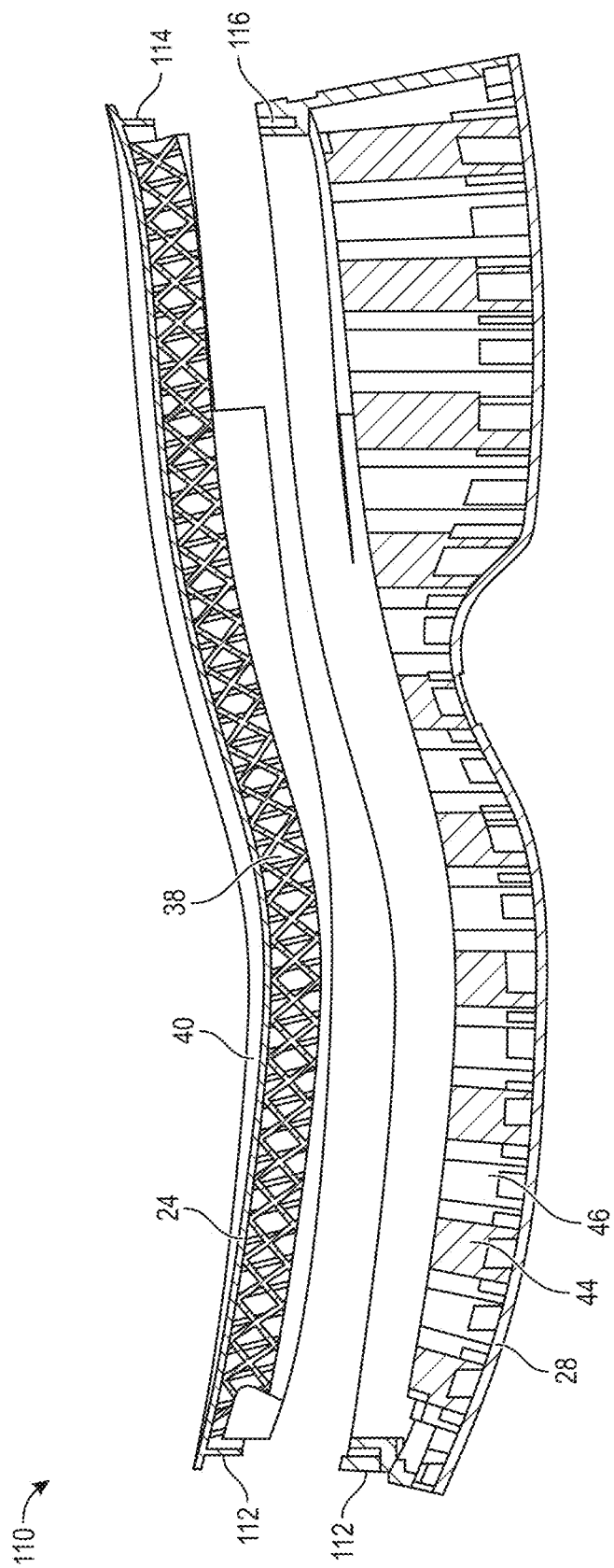
FIGS. 11C and 11D are cross-sectional views of the embodiment of FIG. 11A.
Figure 11D:
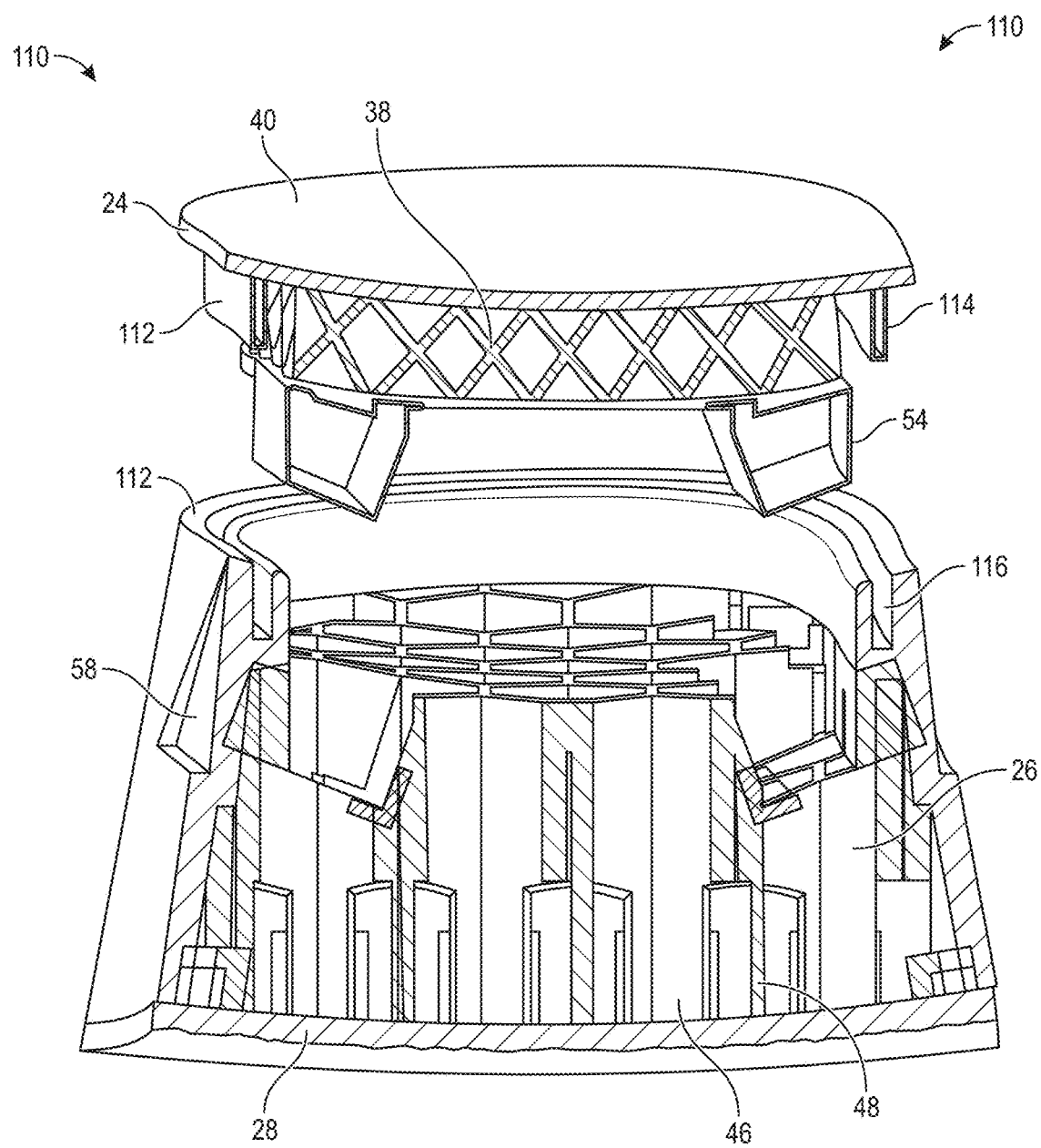
Figure 12A:
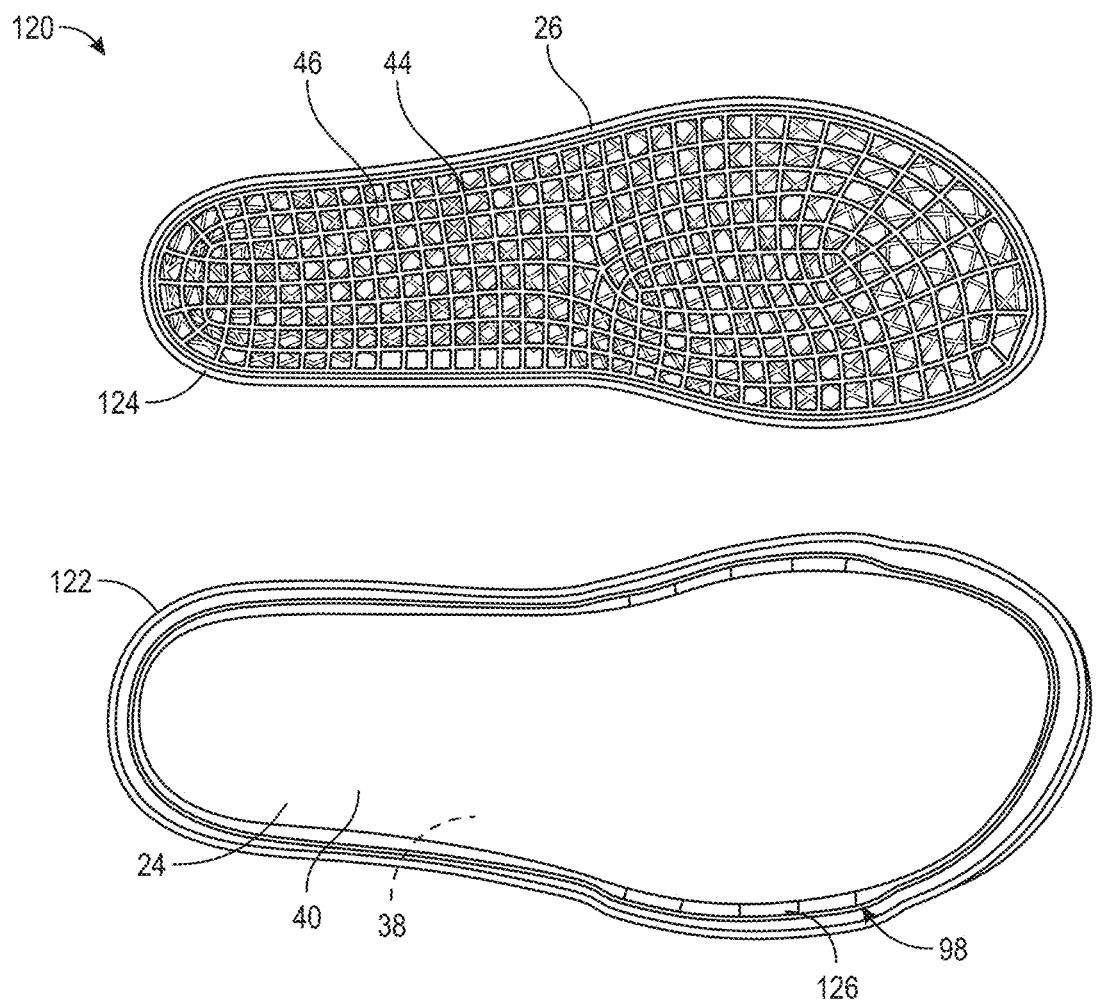
FIG. 12A is a partially exploded plan view of a sole assembly of another embodiment of the present technology.
Figure 12B:
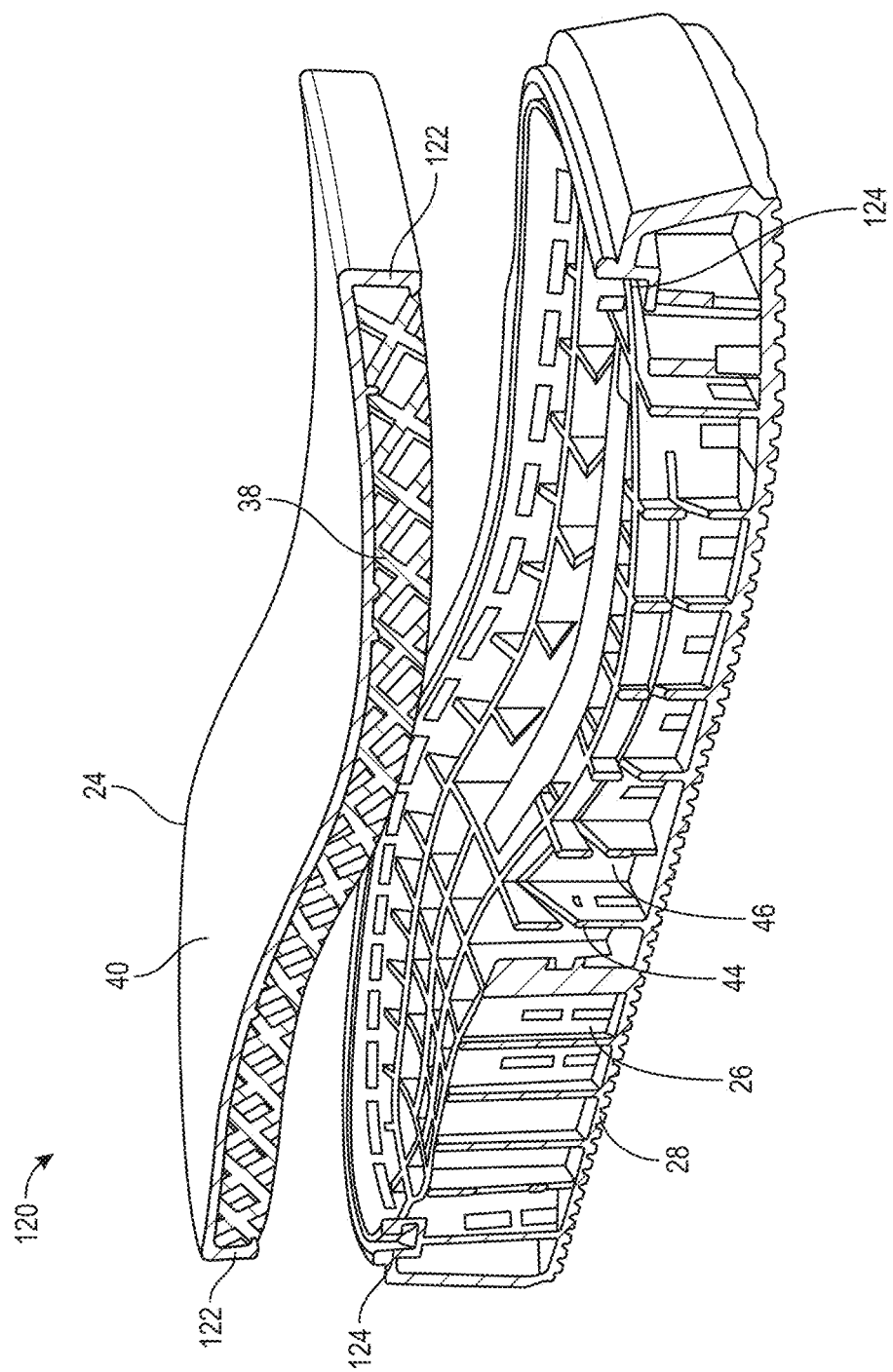
FIGS. 12B-12D are partially exploded cross-sectional views of the sole assembly of FIG. 12A.
Figure 12C:
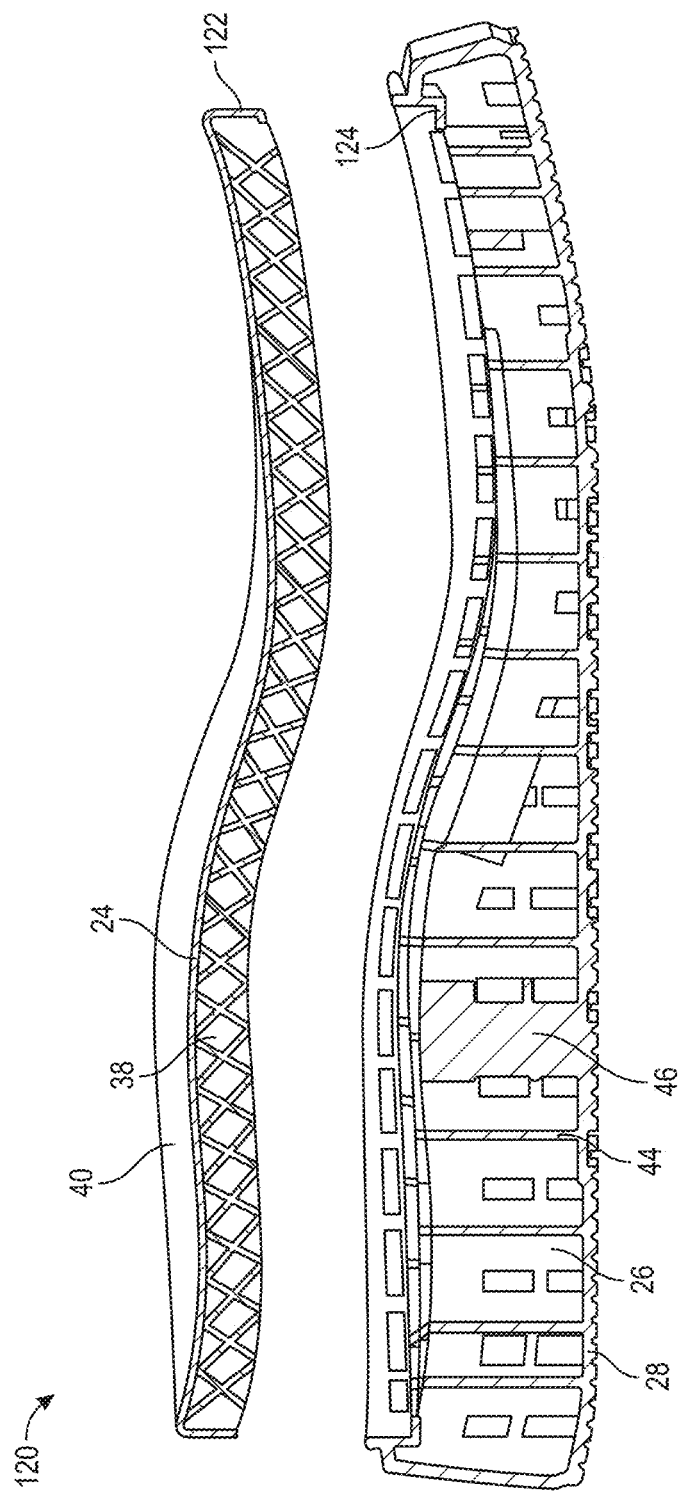
Figure 12D:
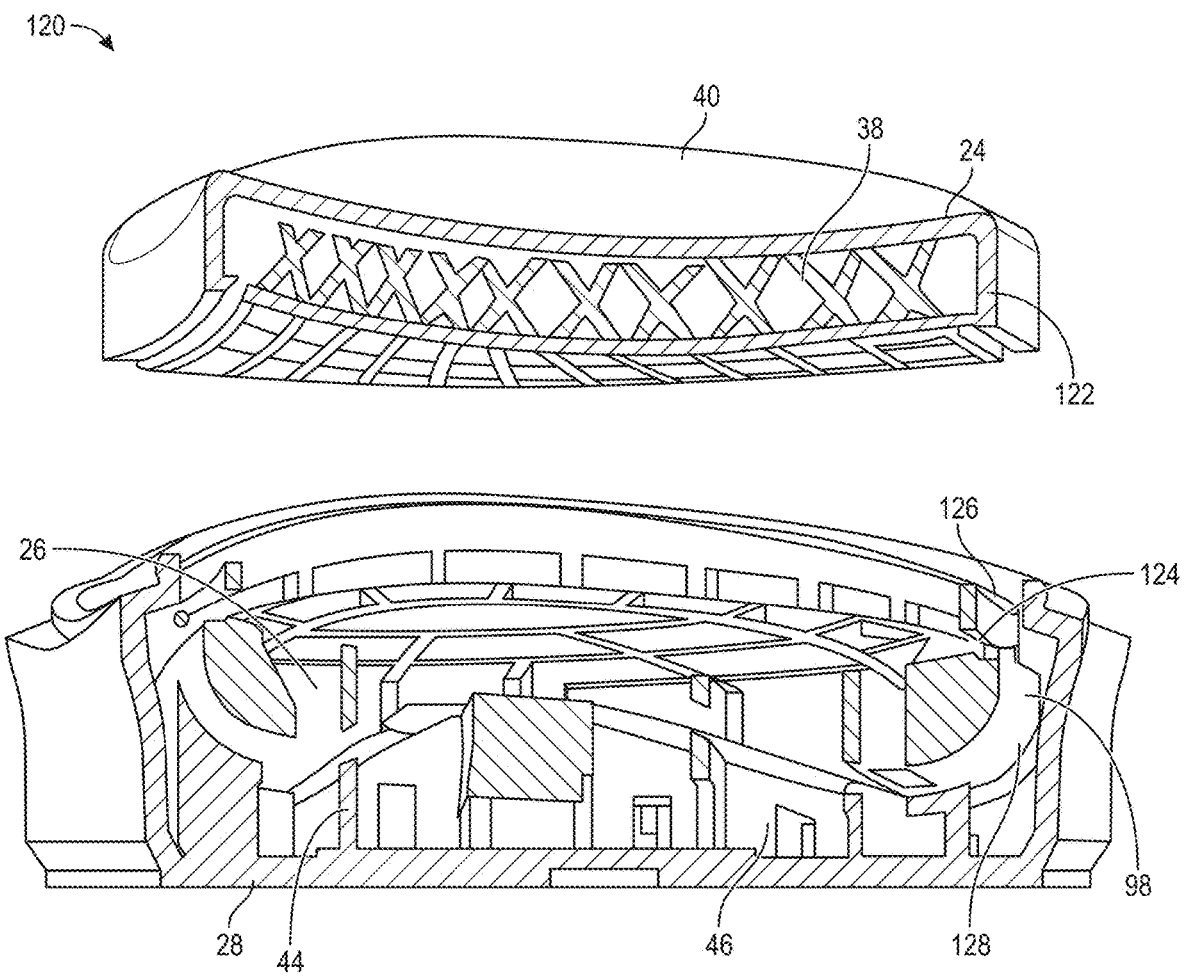

The insole portion 24 and midsole portion 26 have mating attachment features 112 around some or all of their perimeters so as to securely interconnect the insole portion to the integral midsole/outsole portions 26/28 to form the assembled sole assembly 110. As seen in FIG. 11D, the mating attachment features 112 include a flange 114 extending downwardly from the perimeter of the platform layer 40, and a mating groove 116 around the top of the midsole portion 26. Accordingly, the attachment features 112 provide a tongue-and-groove connection between the insole and midsole portions 24 and 26 for secure interconnection between the components. In other embodiments, the tongue-and-groove arrangement of the attachment features 112 can be inverted with the flange 114 extending upwardly around the midsole portion 26, and the groove 116 can be provided around the insole portion 24. In the illustrated embodiment, the attachment features 112 are substantially continuous around the perimeters of the insole and midsole portions 24 and 26, although the attachment features 92 can be segmented with a plurality of attachment feature segments positioned around the insole and midsole portion perimeters. The attachment features 112 of the insole and midsole portions 24 and 26 can be permanently connected together with adhesive, stitching, fasteners, welding, or other suitable connection techniques.

As seen in FIG. 11D, the insole portion 24 of the illustrated embodiment includes integral anchor features 54 extending downwardly from the lattice 38 and/or the platform layer 40. The anchor features 54 extend into the open top of the midsole portion 26 and are positioned laterally inward of the alignment feature 58 on the sidewall of the midsole portion 26. Accordingly, when the insole portion 24 is assembled with the midsole portion 26, the upper (not shown) can be arranged in the alignment feature 58 and joined to the sole assembly 110 with staples, nails, rivets, stitching, or other fasteners that extend through the upper, the midsole sidewall, and are fixedly embedded in the anchor features 54. In other embodiments, the attachment features 54 can be integrally formed in the midsole portion 26, such as inward of the alignment features 58.

Figure 13A:
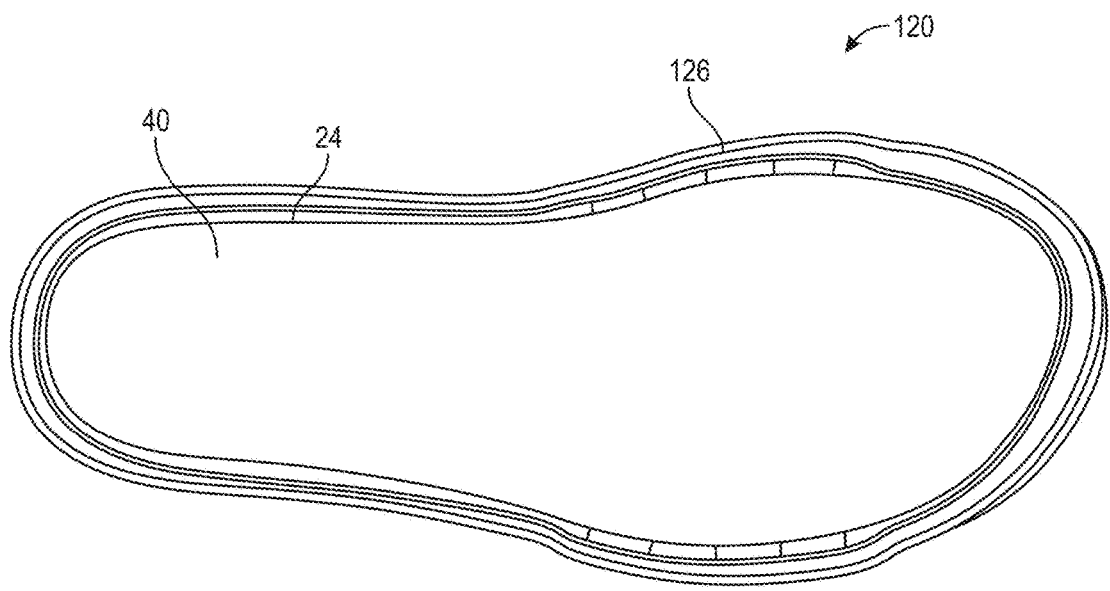
FIGS. 13A and 13B are plan and cross-sectional views of the sole assembly of FIG. 12A in a non-exploded view.
Figure 13B:
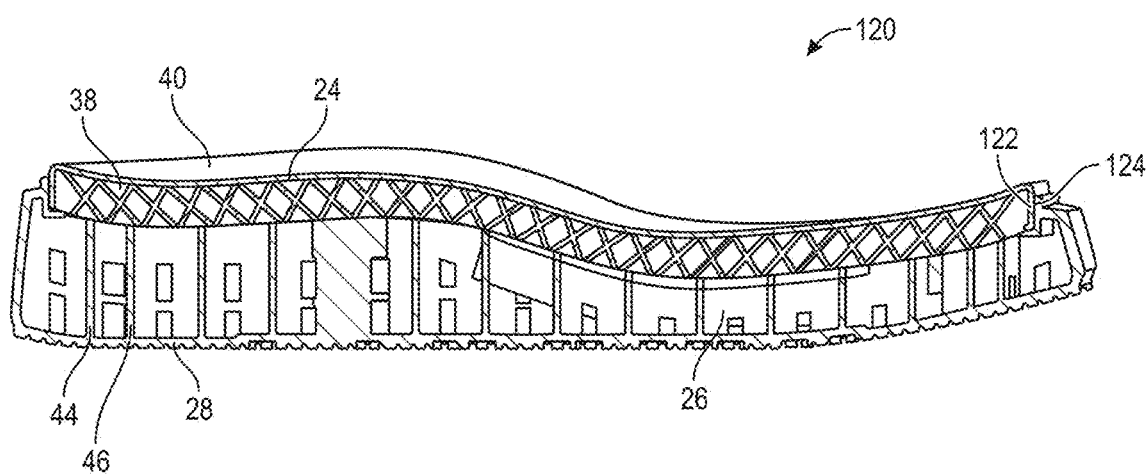

FIGS. 12A-12D are partially exploded plan and cross-sectional views of a sole assembly 120 of an embodiment of the present technology. FIGS. 13A and 13B are plan and cross-sectional views of the sole assembly 120 in a non-exploded arrangement. Similar to the embodiment discussed above and shown in FIGS. 11A-11D, the midsole portion 26 of this embodiment is integrally printed or otherwise additively manufactured with the outsole portion 28, and the insole portion 24 is separately printed or otherwise formed. The top of the cavities 46 of the midsole portion 26 and the lattice 38 of the insole portion 24 are open until the insole portion 24 is attached atop the midsole portion 26, thereby allowing for easy and fast removal of excess manufacture materials during assembly as discussed above.

The insole portion 24 and midsole portion 26 have mating attachment features 58 around some or all of their perimeters so as to securely interconnect the insole portion to the integral midsole/outsole portions 26/28 to form the assembled sole assembly 120. In the illustrated embodiment, the mating attachment feature on the insole portion 24 is a hook flange 122 with a hooked bottom edge that fits into a shaped retention channel 124 formed around all or portions of the upper perimeter of the midsole portion 26. When the insole portion 24 is assembled with the midsole/outsole portions 26/28, the insole portion 24 is positioned over the cavities 46 of the midsole so the lattice 38 will be above and supported by the internal supports 44. The hooked flange 122 is pressed into the retention channel 124, such that the hooked flange slightly deflects, until the hooked bottom edge snaps into place within the channel 124. Accordingly, the attachment features 122 provide a locking hook engagement between the insole and midsole portions 24 and 26, respectively, for secure interconnection between the components. In other embodiments, the locking hook arrangement can be inverted with the hook flange 122 extending upwardly around the midsole portion 26, and the retention channel 124 can be provided around the insole portion 24. The locking hook arrangement can be continuous or segmented around the insole and midsole portions 24 and 26.

The illustrated embodiment has an alignment feature 98 that includes an open slot 126 and receiving channel 128 analogous to the embodiment of FIGS. 9A-9D and 10. In this embodiment, however, the lateral and/or medial sides of the insole portion 24 and/or the midsole portion 26 are contoured to form an open slot 126 between the components when the insole portion 24 is snapped into place on the midsole portion 26. The open slot 126 is aligned with the receiving channel 128 (FIG. 12D) integrally formed in the medial and lateral sides of the midsole portion. The slot 126 and receiving channel 128 are configured to receive the lower area of the upper, so the upper extends through the slot 126 and into the receiving channel 128. The upper can then be affixed to the sole assembly 120 via adhesive, fastener, or other retention technique. In another embodiment the slot 126 and the receiving channel 128 are configured to allow the upper to be stapled or otherwise joined to itself to form a band that feeds through the slot and the core of the midsole portion. These constructions can be particularly applicable sandals, slides, or other open-toe style footwear. The construction, however, can be used for other footwear styles, including closed-toe styles.

Figure 14A:
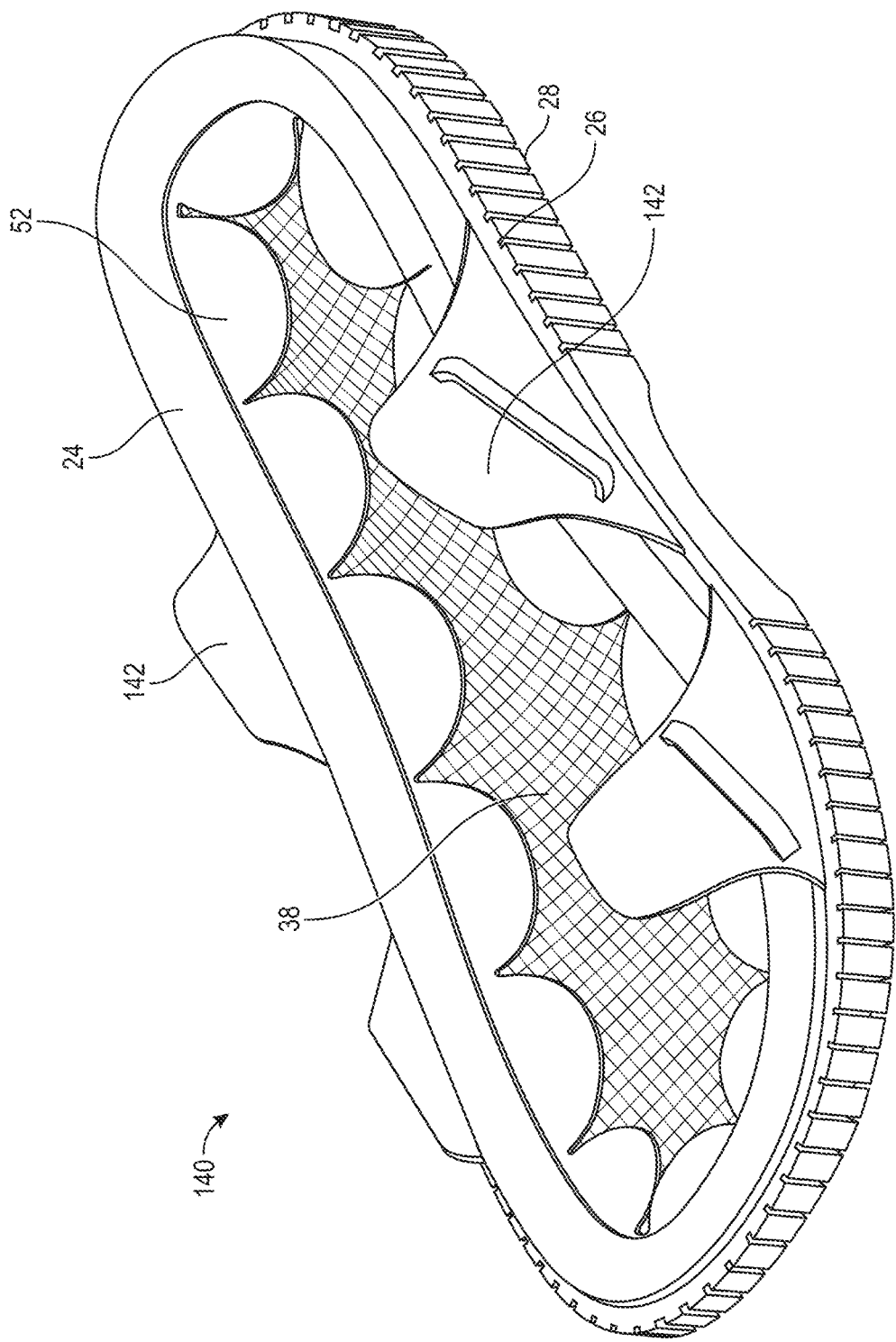
FIG. 14A is an isometric view of a sole assembly of another embodiment of the present technology.
Figure 14B:
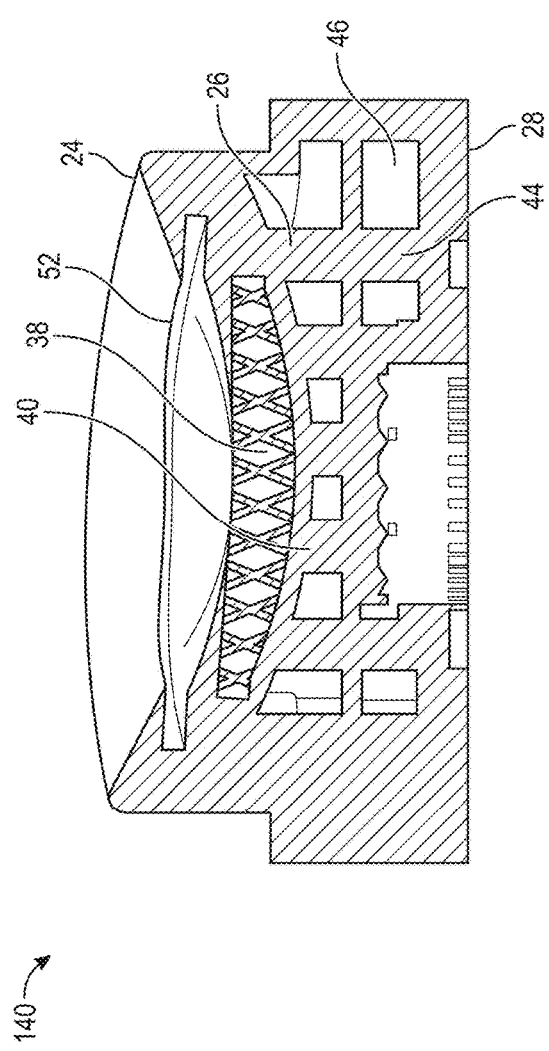
FIGS. 14B and 14C are cross-sectional views of the sole assembly of FIG. 14A.
Figure 14C:
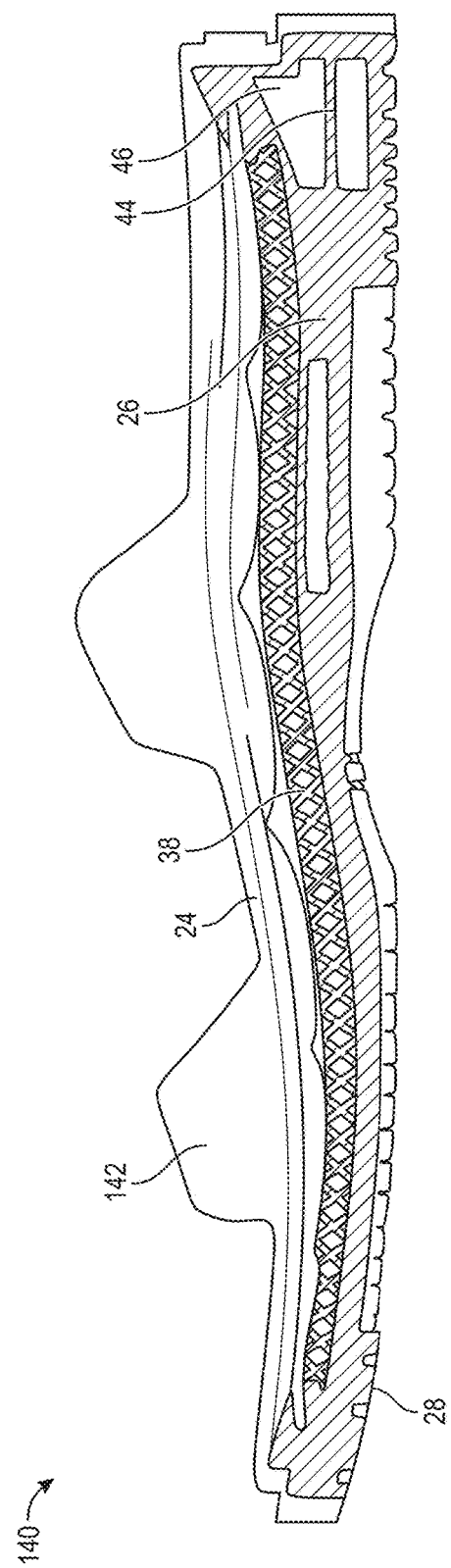

FIGS. 14A-14C are isometric and cross-sectional views of a sole assembly 140 of another embodiment of the present technology. In this embodiment, the sole assembly 140 is a unitary member with integrally formed insole, midsole and outsole portions made via 3-D printing or other additive manufacturing process. The sole assembly 140 of the illustrated embodiment is particularly suitable for a sandal configuration, although similar constructions can be used for footwear assemblies of different styles. In the illustrated embodiment, the sole assembly 140 has attachment flaps 142 integrally connected to and extending upwardly from the sides of the midsole portion 26 and/or the insole portion 24. The attachment flaps 142 are configured to attach to an upper formed by straps or by a vamp portion that can be riveted, adhered, fastened, or otherwise attached to the flaps. The insole portion 24 also has scalloped-shaped retention features 52 positioned over the edge areas of the lattice 38, so a sock liner can be positioned over the lattice 38 and held in place under the scalloped retention features 52. In the illustrated embodiment, the retention features 52 can be adhered or otherwise connected to the sock liner to hold it in place. Other embodiments can have retention features 52 with different shapes or configurations.

As seen in FIGS. 14B and 14C, the midsole portion 26 of the illustrated embodiment has integral internal supports 44 and cavities 46 formed at least in the heel area to provide some additional cushioning and impact absorption for the wearer's foot, particularly during the heel-strike phase of the wearer's gait cycle. The sole assembly 140 has a fairly low profile, so the internal supports 44 and cavities 46 are not provided in the forefoot area. Other embodiments, however, can include the internal supports 44 and cavities 46 in the forefoot area of the sole assembly 140, as illustrated in FIG. 15A.

Figure 15A:
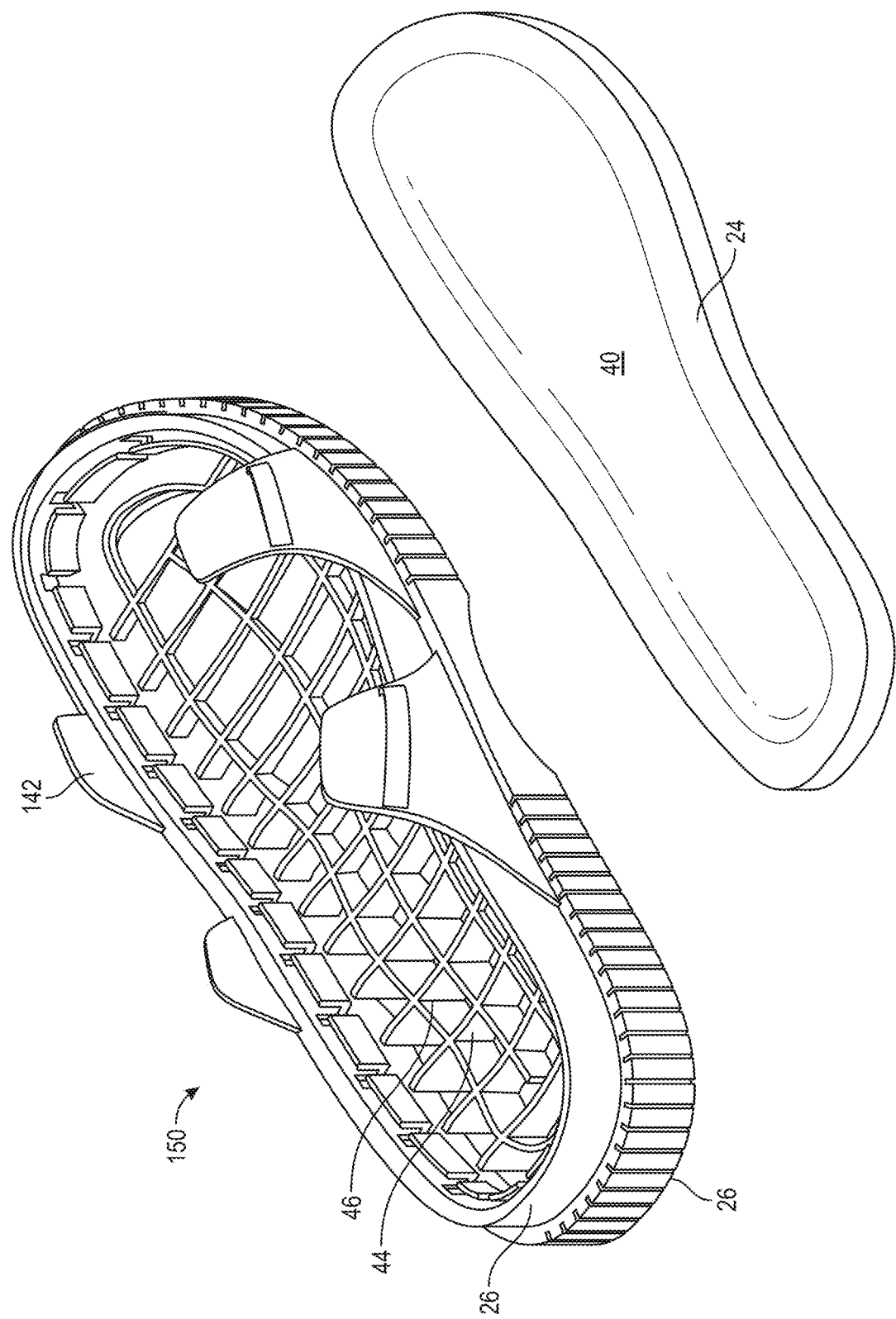
FIG. 15A is a partially exploded top isometric view of a sole assembly of another embodiment of the present technology.
Figure 15B:
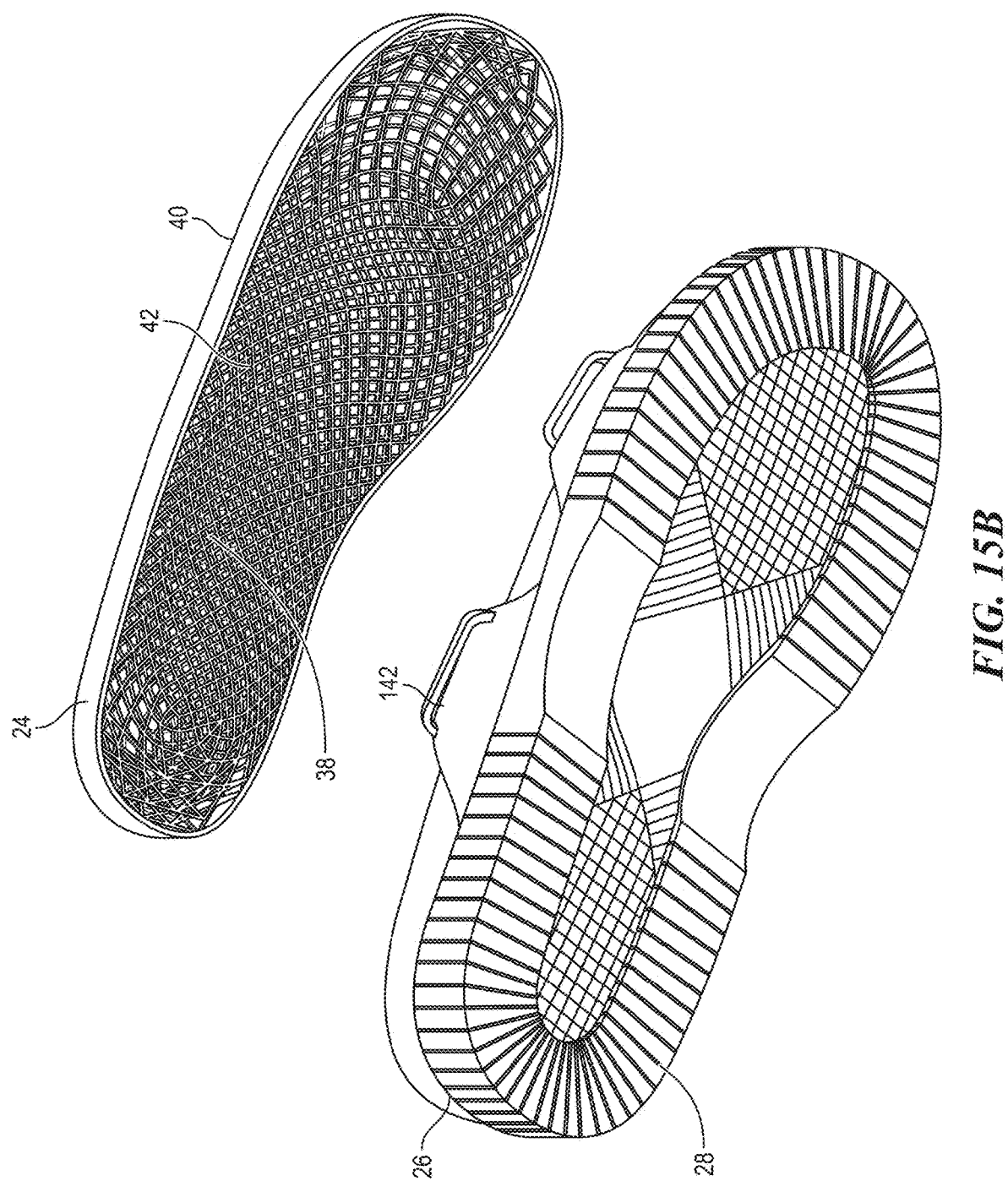
FIG. 15B is a partially exploded bottom isometric view of the sole assembly of FIG. 15.

FIGS. 15A and 15B are partially exploded top and bottom isometric views of a sole assembly 150 of another embodiment of the present technology. As seen in FIG. 15A, the sole assembly 150 has the midsole portion 24 that is integrally 3-D printed or otherwise additively manufactured with the outsole portion 28, and the insole portion 24 is separately printed or otherwise formed. The midsole portion also has integral attachment flaps 142 for connection to the upper, as discussed above in connection with FIGS. 14A-14C. The insole portion 24 is constructed with the lattice 38 (FIG. 15B) extending downwardly from the platform layer 40. Accordingly, the lattice 138 (Figure of the insole portion 24 and the cavities 46 (FIG. 15A) of the midsole portion 26 can be cleared of excess materials before final assembly of the insole portion 24 with the midsole/insole portions 26/28. The insole portion 24 can be affixed to the midsole portion 26 with an interconnection arrangement similar to the arrangement discussed and shown in FIGS. 11A-11D, 12A-12D, or other interconnection system for alignment and secure attachment of the insole portion 24 atop the midsole portion 26.

Figure 16A:
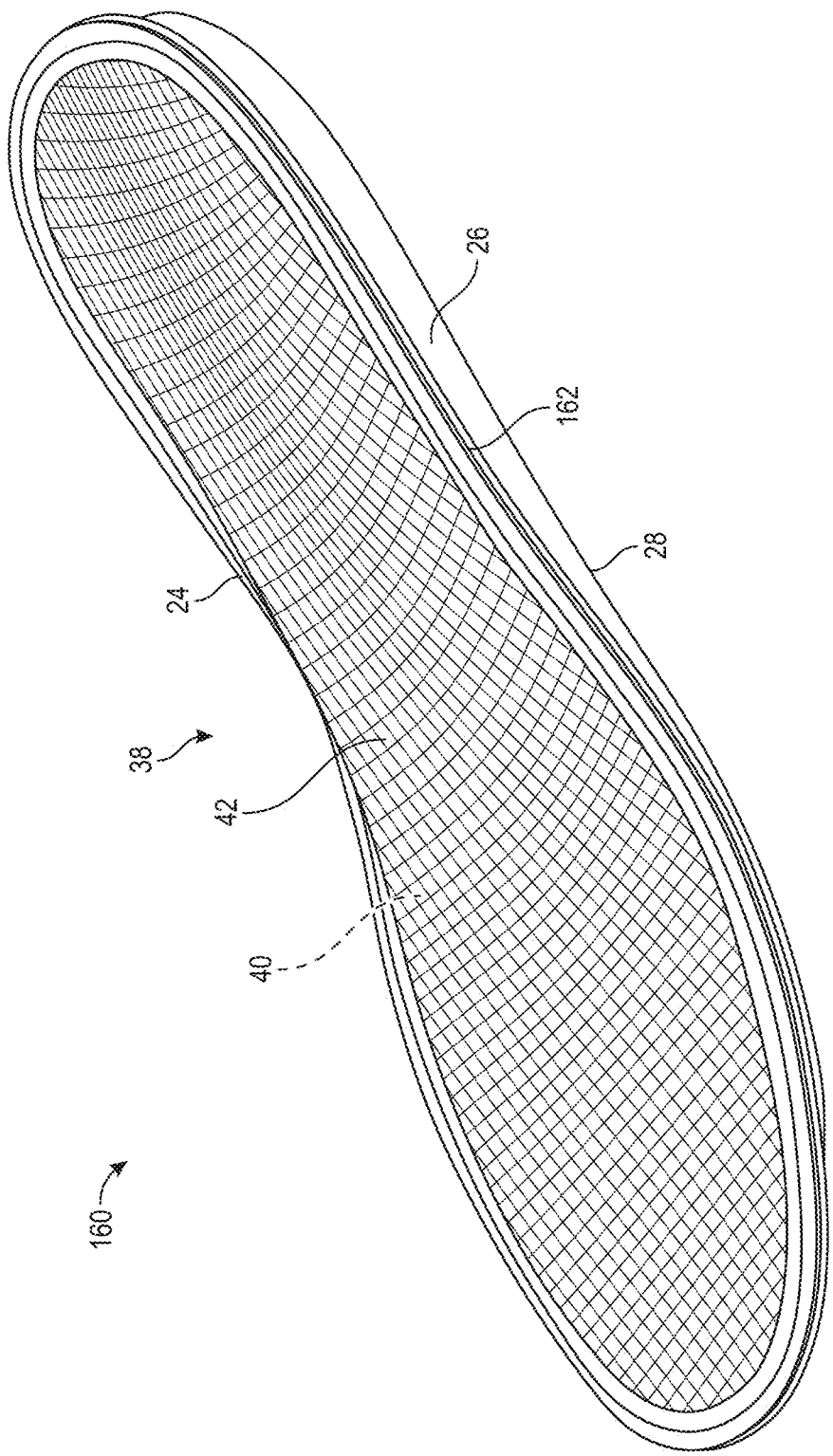
FIG. 16A is an isometric view of a sole assembly of another embodiment of the present technology.
Figure 16B:
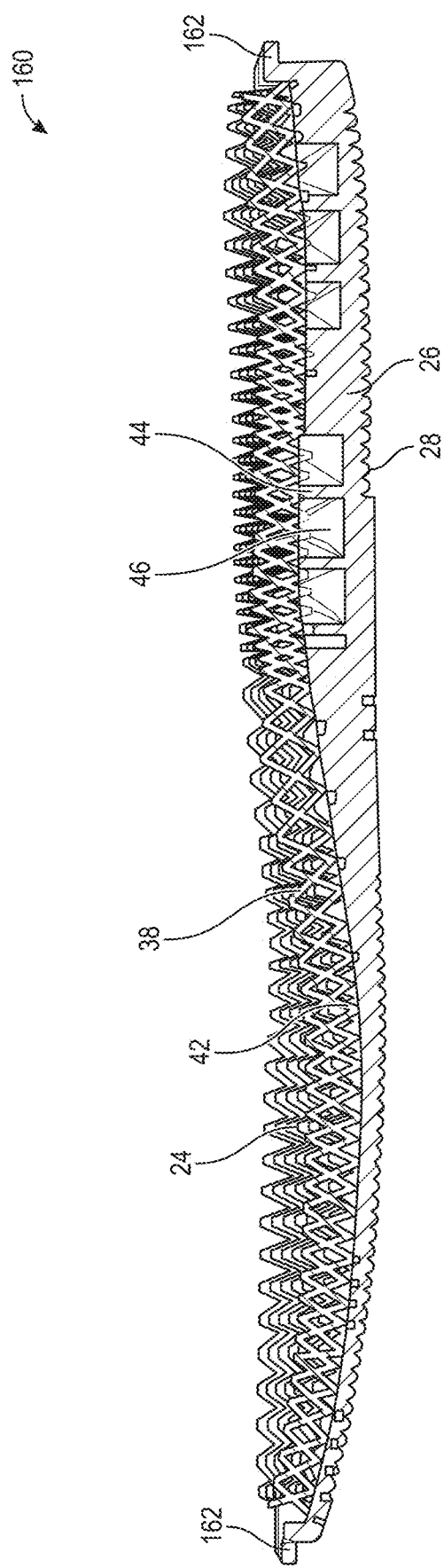
FIG. 16B is a cross-sectional view of the sole assembly of FIG. 16A.

FIGS. 16A and 16B are isometric and cross-sectional views of a sole assembly 160 of another embodiment of the present technology. The sole assembly 160 of this embodiment is also a low-profile construction, such as for the footwear 10 of FIG. 1B. The illustrated sole assembly 160 has cavities 46 (FIG. 16B) and internal supports 44 in the midsole portion 26 in the heel area 32. In the illustrated embodiment, the sole assembly 160 is a unitary member with integrally formed midsole, insole, and outsole portions 26, 24, and 28. The insole portion 24 has the integral lattice 38 projecting upwardly from the midsole portion 26. The insole portion 24 has an attachment flange 162 extending laterally around its perimeter. The attachment flange 162 can used to connect to the upper around some or all of the sole assembly 160. For example, the lower edge of the upper can be attached to the flange 162 by stitching, adhesive, staples, rivets, and/or any other suitable attachment technique. In some embodiments, a sock liner can also be positioned over the lattice 38 and attached to the attachment flange 162 so it is captured between the upper and the flange. Other embodiments can have other configurations that provide the unitary, low profile sole assembly 160 for footwear in accordance with the present technology.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A footwear assembly, comprising:
an upper defining an interior area configured to receive a foot of a wearer, the upper having a lower portion;
a sole assembly affixed to the lower portion of the upper, at least a portion of the sole assembly being made by an additive manufacturing process, the sole assembly having a heel portion and a forefoot portion, the sole assembly having a platform layer and a lattice with interconnected laths extending away from the platform layer in at least the forefoot and heel portions, the lattice and platform layer are positioned to support the foot of the wearer on the sole assembly, and the laths in the lattice being configured to flex to provide first cushioning to the foot of the wearer;
wherein the sole assembly has a plurality of spaced-apart internal support structures connected to and extending downwardly away from the platform layer and defining cavities within the sole assembly, wherein the internal support structures are located at least in the heel portion or the forefoot portion, the support structures configured to flex to provide second cushioning to the foot of the wearer;
wherein the sole assembly has a perimeter portion bounded within the sole assembly, and the sole assembly has a plurality of integral anchor features positioned adjacent to the perimeter portion and adjacent to at least one of the cavities, wherein the lower portion of the upper is fastened to the perimeter portion of the sole assembly with fastening features securely engaged and affixed to the anchor features without penetrating into the cavities; and
wherein the sole assembly has an outsole portion connected to the bottom of the sole assembly and forming a ground engaging surface, wherein the outsole portion is positioned to close and seal the cavities in the sole assembly.

2. The footwear assembly of claim 1 wherein the outsole portion is integrally connected to the sole assembly forming a unitary sole formed via the additive manufacturing process.

3. The footwear assembly of claim 1 wherein the lattice is formed atop the platform layer with the laths extending upwardly from the platform layer.

4. The footwear assembly of claim 1 wherein internal support structures are oriented substantially parallel, perpendicular, or angularly relative to the platform layer.

5. The footwear assembly of claim 1 wherein the outsole is manufactured separately from the sole assembly and connected to a bottom edge of the sole assembly, wherein the outsole closes bottom ends of at least a plurality of the cavities.

6. The footwear assembly of claim 1 wherein the sole assembly comprises an insole portion integrally connected to a midsole portion, the midsole portion having one or more integral first attachment features, and the outsole portion having one or more second attachment features that mateably engage the first attachment features and fixedly attach the outsole portion to the bottom of the midsole portion to enclose the cavities within the midsole portion.

7. The footwear assembly of claim 1 wherein the fastening features are stitches, staples, nails, or rivets.

8. The footwear assembly of claim 1, further comprising a sock liner secured to the perimeter portion of the sole assembly and covering the lattice, at least a portion of the sock liner is captured between the lower portion of the upper and the perimeter portion of the sole assembly.

9. The footwear assembly of claim 1, further comprising a sock liner covering the lattice, and the sole assembly has integral retention features extending over portions of the lattice, wherein the sock liner is captured between the retention features and the lattice.

10. A footwear assembly, comprising:
an upper having a lower portion; and
a sole assembly affixed to the lower portion of the upper, wherein at least a portion of the sole assembly is made by an additive manufacturing process, the sole assembly having a heel portion, a forefoot portion, and a perimeter portion around the heel and forefoot portions;
the sole assembly comprises a midsole portion, an insole portion atop the midsole portion, and an outsole portion connected to the bottom of the midsole portion, the insole portion including a lattice having a plurality of interconnected laths, the lattice being positioned at least in the forefoot and heel portions, the lattice being positioned to support the foot of the wearer, and the laths in the lattice being configured to flex and provide cushioning to the foot of the wearer;

the midsole portion of the sole assembly having a plurality of spaced-apart internal support structures extending downwardly relative to the lattice and defining cavities within the sole assembly, the internal support structures being located at least in the heel portion or the forefoot portion, the support structures being configured to flex in response to loads applied from the wearer's foot during use;

wherein the sole assembly having a plurality of integral anchor features positioned radially outward of the cavities and the support structures, wherein the lower portion of the upper is fastened to the perimeter portion of the sole assembly with fastening features that penetrate the anchor features without penetrating into the cavities; and wherein the outsole portion is positioned to close at least a portion of the cavities in the sole assembly and to form a ground engaging surface.

11. The footwear assembly of claim 10 wherein the outsole portion is integrally connected to the sole assembly forming a unitary sole formed via the additive manufacturing process.

12. The footwear assembly of claim 10 wherein the midsole portion is integrally formed with one of the insole portion or the outsole portion, and the midsole portion has one or more first attachment features, and the other one of the insole portion or the outsole portion has one or more second attachment features that mateably attach to the first attachment features to affix the other one of the insole portion or the outsole portion to the midsole portion.

13. The footwear assembly of claim 10 wherein internal support structures are oriented substantially parallel, perpendicular, or angularly relative to a top surface of the sole assembly.

14. The footwear assembly of claim 10 wherein the sole assembly has a platform layer positioned between the lattice and the internal support structures, wherein the lattice projects upwardly away from the internal platform, and the internal support structures extend downwardly from the platform layer.

15. The footwear assembly of claim 10 wherein the sole assembly has a platform layer adjacent to the lattice, wherein the laths of the lattice extend away from the platform layer, and the internal support structures extend downwardly away from the platform layer.

16. The footwear assembly of claim 10 wherein the sole assembly has an alignment feature configured to receive and align the lower portion of the upper along the sole assembly and adjacent to the anchor features.

17. A sole assembly for footwear having an upper, the sole assembly comprising:
an upper insole portion, a midsole portion attached to the upper insole portion, and an outsole portion attached to the midsole portion, wherein the midsole portion is formed with the upper insole portion or the outsole portion as a unitary structure, wherein the sole assembly has a heel portion, a forefoot portion, and a perimeter portion around the heel and forefoot portions, wherein the perimeter portion is configured for connection to a lower portion of the upper, wherein the upper insole portion comprises a platform layer and lattice, the platform layer is above the midsole portion, and the lattice has a plurality of interconnected laths extending away from the platform layer, the lattice being positioned at least in the forefoot and heel portions, and the laths in the lattice being configured to flex and provide cushioning to the foot of the wearer, wherein the midsole portion has a plurality of internal support structures extending downwardly relative to the layer platform and defining cavities within the midsole portion, the internal support structures being located at least in the heel portion or the forefoot portion, the support structures being configured to flex in response to loads applied from the wearer's foot during use;

wherein the upper insole portion or the midsole portion has a plurality of integral anchor features positioned radially outward of the cavities and the support structures, wherein the perimeter portion of the sole assembly is configured to be attached to the lower portion of the upper with fastening features that securely engage the anchor features; and wherein the outsole portion is positioned to close at least a portion of the cavities in the sole assembly and to form a ground engaging surface.

18. The sole assembly of claim 17 wherein the outsole portion is integrally connected to the midsole portion to provide a unitary sole.

19. The sole assembly of claim 17, further comprising a sock liner that covers the lattice and that is secured to the perimeter portion of the sole assembly.

20. The sole assembly of claim 17 wherein the insole portion or the midsole portion has an alignment feature configured to receive and align the lower portion of the upper along the sole assembly and adjacent to the anchor features.

* * * * *